US012487877B2

(12) United States Patent
Han et al.

(10) Patent No.: US 12,487,877 B2
(45) Date of Patent: Dec. 2, 2025

(54) NETWORK INTERFACE CARD, MESSAGE SENDING METHOD, AND STORAGE APPARATUS

(71) Applicant: HUAWEI TECHNOLOGIES CO., LTD., Guangdong (CN)

(72) Inventors: Zhaojiao Han, Shenzhen (CN); Xinteng Zhao, Shenzhen (CN); Xianjun He, Chengdu (CN); Qiang Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/606,002

(22) Filed: Mar. 15, 2024

(65) Prior Publication Data

US 2024/0220347 A1  Jul. 4, 2024

Related U.S. Application Data

(63) Continuation of application No. PCT/CN2022/118989, filed on Sep. 15, 2022.

(30) Foreign Application Priority Data

Sep. 17, 2021 (CN) .......................... 202111094130.2

(51) Int. Cl.
*G06F 11/00* (2006.01)
*G06F 11/07* (2006.01)

(52) U.S. Cl.
CPC .............................. *G06F 11/0772* (2013.01)

(58) Field of Classification Search
CPC .......................... G06F 11/0772; G06F 11/0727
See application file for complete search history.

(56) References Cited

U.S. PATENT DOCUMENTS 6,766,467 B1 *  7/2004  Neal ................... G06F 11/0727
                                                      714/5.11
6,978,300 B1 * 12/2005  Beukema .............. H04L 41/082
                                                      370/235

(Continued)

OTHER PUBLICATIONS

"InfiniBandTM Architecture Specification vol. 1",Release 1.3,Mar. 3, 2015,total 1842 pages.

(Continued)

*Primary Examiner* — Philip Guyton

(57) ABSTRACT

A network interface card, a message sending method, and a storage apparatus are provided. The network interface card includes a processor and a communication interface connected to the processor. The processor is configured to obtain a first piece of first indication information and a first piece of second indication information. The first piece of first indication information indicates a first identifier of a non-volatile storage medium corresponding to a first RDMA message, and the first piece of second indication information indicates whether the non-volatile storage medium corresponding to the first identifier is faulty. The communication interface is configured to send the first RDMA message when the first piece of first indication information and the first piece of second indication information indicate that the non-volatile storage medium corresponding to the first RDMA message is not faulty.

17 Claims, 25 Drawing Sheets

(56) References Cited

U.S. PATENT DOCUMENTS

| | | | |
|---|---|---|---|
| 9,753,822 B1* | 9/2017 | Tringale | G06F 11/1423 |
| 2012/0066447 A1* | 3/2012 | Colgrove | G06F 3/0613 |
| | | | 711/E12.001 |
| 2016/0041863 A1* | 2/2016 | Nakagawa | G06F 11/0772 |
| | | | 714/57 |
| 2018/0011763 A1* | 1/2018 | Tanaka | G06F 11/1076 |
| 2018/0095915 A1 | 4/2018 | Prabhakar et al. | |
| 2018/0129449 A1 | 5/2018 | Romem et al. | |
| 2021/0081268 A1* | 3/2021 | Bando | H04L 69/40 |
| 2021/0349643 A1* | 11/2021 | Hallak | G06F 3/067 |
| 2022/0138059 A1* | 5/2022 | Lee | G06F 11/0772 |
| | | | 714/4.5 |

OTHER PUBLICATIONS

"NVM ExpressTM over Fabrics Revision 1.0a", Jul. 17, 2018, total 51 pages.

Extended European Search Report issued in EP22869317.2, dated Nov. 18, 2024, 11 pages.

Guo Chen et al., "MP-RDMA: Enabling RDMA With Multi-Path Transport in Datacenters", vol. 27, No. 6, Dec. 1, 2019, XP011762690, total 16 pages.

\* cited by examiner

NETWORK INTERFACE CARD, MESSAGE SENDING METHOD, AND STORAGE APPARATUS

CROSS-REFERENCE TO RELATED APPLICATIONS

This application is a continuation of International Application No. PCT/CN2022/118989, filed on Sep. 15, 2022, which claims priority to Chinese Patent Application No. 202111094130.2, filed on Sep. 17, 2021. The disclosures of the aforementioned applications are hereby incorporated by reference in their entireties.

TECHNICAL FIELD

The present disclosure relates to the storage field, and in particular, to a network interface card, a message sending method, and a storage apparatus.

BACKGROUND

Currently, much data is not stored locally, but stored in remote storage apparatuses. As shown in FIG. 1, an embodiment of the present disclosure provides a storage system including a storage apparatus (or referred to as a storage array) 11 and a host client 12. The storage apparatus 11 is connected to the host client 12 through a network, and may provide a data storage service for a plurality of host clients 12. With the emergence of a non-volatile memory express (NVMe)-based solid state drive (SSD), a protocol for the host client 12 to remotely access the storage apparatus 11 gradually migrates to an NVMe over fabric (NoF) network. Remote direct memory access (RDMA) is a standard in the NoF network, and can reduce a delay of accessing data by the storage apparatus.

A queue pair (QP) connection may be established between the storage apparatus 11 and the host client 12, and the host client 12 may access a plurality of non-volatile storage media in the storage apparatus 11 through the QP connection. When the storage apparatus 11 responds to an IO read request from the host client 12 through the QP connection, to send IO data to the host client 12, if a packet loss occurs because a non-volatile storage medium that stores the IO data is faulty, and the storage apparatus 11 cannot determine an identifier of the faulty non-volatile storage medium, the storage apparatus 11 cannot process the faulty non-volatile storage medium. Therefore, the host client 12 indicates the storage apparatus 11 to perform retransmission a plurality of times. When a quantity of retransmission times exceeds a threshold, the QP connection is disconnected, and the host client 12 cannot access a normal non-volatile storage medium in the storage apparatus 11.

SUMMARY

Embodiments of the present disclosure provide a network interface card, a message sending method, and a storage apparatus, to prevent a QP disconnection between a host client and the storage apparatus.

To achieve the foregoing objective, the following technical solutions are used in embodiments of the present disclosure.

According to a first aspect, a network interface card is provided, including a processor and a communication interface connected to the processor. The processor is configured to obtain a first piece of first indication information and a first piece of second indication information. The first piece of first indication information indicates a first identifier of a non-volatile storage medium corresponding to a first remote direct memory access RDMA message, and the first piece of second indication information indicates whether the non-volatile storage medium corresponding to the first identifier is faulty. The communication interface is configured to send the first RDMA message when the first piece of first indication information and the first piece of second indication information indicate that the non-volatile storage medium corresponding to the first RDMA message is not faulty.

According to the network interface card provided in this embodiment, before sending the RDMA message, the network interface card first obtains the first indication information and the second indication information. The first indication information indicates the first identifier of the non-volatile storage medium corresponding to the to-be-sent RDMA message, and the second indication information indicates whether the non-volatile storage medium corresponding to the first identifier is faulty, so that the network interface card determines whether the non-volatile storage medium corresponding to the RDMA message is faulty. The network interface card normally sends the RDMA message only when no fault occurs. In other words, when sending the RDMA message, the network interface card can learn whether the non-volatile storage medium is faulty, to perform corresponding processing on whether to send the RDMA message. In this way, the network interface card of a host client can always normally receive the RDMA message, to prevent a QP disconnection between a host client and the storage apparatus.

The non-volatile storage medium corresponding to the first RDMA message includes the following manners: If the first RDMA message is a packet of an RDMA WRITE message, the non-volatile storage medium corresponding to the first RDMA message is a non-volatile storage medium that stores IO data carried in the RDMA WRITE message. If the first RDMA message is a packet of a SEND message corresponding to the RDMA WRITE message, the non-volatile storage medium corresponding to the first RDMA message is a non-volatile storage medium that stores IO data corresponding to the SEND message.

The RDMA WRITE message may be split into a plurality of RDMA packets. It is possible that the non-volatile storage medium is not faulty when the communication interface sends first several RDMA packets, and the non-volatile storage medium is faulty when the communication interface sends last several RDMA packets. Therefore, each time the network interface card sends an RDMA packet, the network interface card first determines the first indication information and the second indication information. If the non-volatile storage medium is faulty, a subsequent RDMA packet in the RDMA WRITE message is not sent. In this case, the communication interface may directly send a constructed RDMA packet (or referred to as a forged RDMA packet) for the RDMA WRITE message. A packet sequence number of the constructed RDMA packet is consistent with a packet sequence number of the RDMA packet that is not sent in the RDMA WRITE message, to deceive the host client to receive the complete RDMA WRITE message. Alternatively, the communication interface may not send a constructed RDMA packet of the RDMA WRITE message, and may send the constructed RDMA packet when waiting for retransmission.

In a possible implementation, the processor is further configured to obtain a second piece of first indication information and a second piece of second indication information. The second piece of first indication information indicates a second identifier of a non-volatile storage medium corresponding to a second RDMA message, and the second piece of second indication information indicates whether the non-volatile storage medium corresponding to the second identifier is faulty. The communication interface is configured to send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty. A packet sequence number of an RDMA packet in the second RDMA message is a packet sequence number of a previously sent RDMA packet plus 1. For example, if a PSN of the previously sent RDMA packet is n, a PSN of the RDMA packet in the second RDMA message starts from n+1. In this way, the network interface card of the host client can always normally receive the RDMA message, to prevent the QP disconnection between the host client and the storage apparatus.

In a possible implementation, in a send queue, posting time of a work queue element corresponding to the first RDMA message is earlier than posting time of a work queue element corresponding to the second RDMA message. That is, the first RDMA message is expected to be sent before the second RDMA message. In this case, when an SSD corresponding to the previous first RDMA message is faulty, the previous first RDMA message is skipped, and the subsequent second RDMA message is sent. Alternatively, posting time of a WQE corresponding to the first RDMA message may be later than posting time of a WQE corresponding to the second RDMA message. That is, the second RDMA message is expected to be sent before the first RDMA message.

In a possible implementation, the processor is further configured to obtain a third piece of first indication information and a third piece of second indication information. The third piece of first indication information indicates a third identifier of a non-volatile storage medium corresponding to a third RDMA message, and the third piece of second indication information indicates whether the non-volatile storage medium corresponding to the third identifier is faulty. The communication interface is further configured to: receive a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; and send a constructed RDMA packet, where a packet sequence number of the constructed RDMA packet is consistent with the packet sequence number of the lost RDMA packet. Content carried in the constructed RDMA packet is not limited, to deceive the host client to receive the complete RDMA WRITE message.

In a possible implementation, the first indication information is in a work queue element in the send queue. A parameter definition of a Verbs interface in the RDMA protocol may be extended. The first indication information may be in a work queue element that is in the send queue and that corresponds to the to-be-sent RDMA message, or the first indication information may be transferred in another manner. This is not limited in the present disclosure.

In a possible implementation, the processor is further configured to generate third indication information. The third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent. The third indication information is mainly used by the processor to subsequently generate fourth indication information.

In a possible implementation, the processor is further configured to: post a completion queue element to a completion queue after the communication interface receives the non-acknowledge message or an acknowledge message, where the completion queue element includes the fourth indication information, and the fourth indication information indicates whether a posted work queue element is not processed because a corresponding non-volatile storage medium is faulty. A parameter definition of a Verbs interface in the RDMA protocol may be extended. The fourth indication information may be in the completion queue element, or the fourth indication information may be transferred in another manner. This is not limited in the present disclosure. The processor may set the fourth indication information for the corresponding completion queue element based on the third indication information corresponding to each work queue element in the send queue.

According to a second aspect, a network interface card is provided, including a processor and a communication interface connected to the processor. The processor is configured to obtain a first piece of first indication information, a first piece of second indication information, a second piece of first indication information, and a second piece of second indication information. The first piece of first indication information indicates a first identifier of a non-volatile storage medium corresponding to a to-be-sent first RDMA message, the first piece of second indication information indicates whether the non-volatile storage medium corresponding to the first identifier is faulty, the second piece of first indication information indicates a second identifier of a non-volatile storage medium corresponding to a to-be-sent second RDMA message, and the second piece of second indication information indicates whether the non-volatile storage medium corresponding to the second identifier is faulty. The communication interface is configured to send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty. A packet sequence number of an RDMA packet in the second RDMA message is a packet sequence number of a previously sent RDMA packet plus 1.

Before sending the RDMA message, the network interface card provided in this embodiment finds that the non-volatile storage medium corresponding to the first RDMA message is faulty while the non-volatile storage medium corresponding to the second RDMA message is not faulty. The network interface card does not send the first RDMA message corresponding to the faulty non-volatile storage medium, but sends the second RDMA message corresponding to the normal non-volatile storage medium. A packet sequence number of an RDMA packet in the second RDMA message is a packet sequence number of a previously sent RDMA packet plus 1. For example, if a PSN of the previously sent RDMA packet is n, a PSN of the RDMA packet in the second RDMA message starts from n+1. In this way, the network interface card of the host client can always normally receive the RDMA message, to prevent the QP disconnection between the host client and the storage apparatus.

The non-volatile storage medium corresponding to the first RDMA message includes the following manners. If the first RDMA message is a packet of an RDMA WRITE message, the non-volatile storage medium corresponding to the first RDMA message is a non-volatile storage medium that stores IO data carried in the RDMA WRITE message. If the first RDMA message is a packet of a SEND message corresponding to the RDMA WRITE message, the non-volatile storage medium corresponding to the first RDMA message is a non-volatile storage medium that stores IO data corresponding to the SEND message.

The RDMA WRITE message may be split into a plurality of RDMA packets. It is possible that the non-volatile storage medium is not faulty when the communication interface sends first several RDMA packets, and the non-volatile storage medium is faulty when the communication interface sends last several RDMA packets. Therefore, each time the network interface card sends an RDMA packet, the network interface card first determines the first indication information and the second indication information. If the non-volatile storage medium is faulty, a subsequent RDMA packet in the RDMA WRITE message is not sent. In this case, the communication interface may directly send a constructed RDMA packet (or referred to as a forged RDMA packet) for the RDMA WRITE message. A packet sequence number of the constructed RDMA packet is consistent with a packet sequence number of the RDMA packet that is not sent in the RDMA WRITE message, to deceive the host client to receive the complete RDMA WRITE message. Alternatively, the communication interface may not send a constructed RDMA packet of the RDMA WRITE message, and may send the constructed RDMA packet when waiting for retransmission.

In a possible implementation, in a send queue, posting time of a work queue element corresponding to the first RDMA message is earlier than posting time of a work queue element corresponding to the second RDMA message. That is, the first RDMA message is expected to be sent before the second RDMA message. In this case, when an SSD corresponding to the previous first RDMA message is faulty, the previous first RDMA message is skipped, and the subsequent second RDMA message is sent. Alternatively, posting time of a WQE corresponding to the first RDMA message may be later than posting time of a WQE corresponding to the second RDMA message. That is, the second RDMA message is expected to be sent before the first RDMA message.

In a possible implementation, the processor is further configured to obtain a third piece of first indication information and a third piece of second indication information. The third piece of first indication information indicates a third identifier of a non-volatile storage medium corresponding to a third RDMA message, and the third piece of second indication information indicates whether the non-volatile storage medium corresponding to the third identifier is faulty. The communication interface is further configured to: receive a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; and send a constructed RDMA packet, where a packet sequence number of the constructed RDMA packet is consistent with the packet sequence number of the lost RDMA packet. Content carried in the constructed RDMA packet is not limited, to deceive the host client to receive the complete RDMA WRITE message.

In a possible implementation, the first indication information is in a work queue element in the send queue. A parameter definition of a Verbs interface in the RDMA protocol may be extended. The first indication information may be in a work queue element that is in the send queue and that corresponds to the to-be-sent RDMA message, or the first indication information may be transferred in another manner. This is not limited in embodiments of the present disclosure.

In a possible implementation, the processor is further configured to generate third indication information. The third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent. The third indication information is mainly used by the processor to subsequently generate fourth indication information.

In a possible implementation, the processor is further configured to: post a completion queue element to a completion queue after the communication interface receives the non-acknowledge message or an acknowledge message, where the completion queue element includes the fourth indication information, and the fourth indication information indicates whether a posted work queue element is not processed because a corresponding non-volatile storage medium is faulty. A parameter definition of a Verbs interface in the RDMA protocol may be extended. The fourth indication information may be in the completion queue element, or the fourth indication information may be transferred in another manner. This is not limited in embodiments of the present disclosure. The processor may set the fourth indication information for the corresponding completion queue element based on the third indication information corresponding to each work queue element in the send queue.

According to a third aspect, a network interface card is provided, including a processor and a communication interface connected to the processor. The processor is configured to obtain a first piece of first indication information, a first piece of second indication information, a third piece of first indication information, and a third piece of second indication information. The first piece of first indication information indicates a first identifier of a non-volatile storage medium corresponding to a first RDMA message, the first piece of second indication information indicates whether the non-volatile storage medium corresponding to the first identifier is faulty, the third piece of first indication information indicates a third identifier of a non-volatile storage medium corresponding to a to-be-sent third RDMA message, and the third piece of second indication information indicates whether the non-volatile storage medium corresponding to the third identifier is faulty. The communication interface is configured to send the first RDMA message when the first piece of first indication information and the first piece of second indication information indicate that the non-volatile storage medium corresponding to the first RDMA message is not faulty; and the communication interface is further configured to: receive a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; send a constructed RDMA packet, where a packet sequence number of the constructed RDMA packet is consistent with the packet sequence number of the lost RDMA packet. Content carried in the constructed RDMA packet is not limited, to deceive a host client to receive a complete RDMA WRITE message.

According to the network interface card provided in this embodiment, the RDMA WRITE message may be split into a plurality of RDMA packets. It is possible that the non-volatile storage medium is not faulty when the communication interface sends first several RDMA packets, and the non-volatile storage medium is faulty when the communication interface sends last several RDMA packets. The communication interface may send the constructed RDMA packet during retransmission. The packet sequence number of the constructed RDMA packet is consistent with the packet sequence number of the lost RDMA packet, to deceive the host client to receive the complete first RDMA message. This avoids a case in which a network interface card of the host client frequently indicates a network interface card of a storage apparatus to perform retransmission because the network interface card of the host client always detects a packet loss in the RDMA message, so that a case in which a QP connection between the host client and the storage apparatus is disconnected because a quantity of retransmission times exceeds a threshold does not occur.

The non-volatile storage medium corresponding to the first RDMA message includes the following manners. If the first RDMA message is a packet of an RDMA WRITE message, the non-volatile storage medium corresponding to the first RDMA message is a non-volatile storage medium that stores IO data carried in the RDMA WRITE message. If the first RDMA message is a packet of a SEND message corresponding to the RDMA WRITE message, the non-volatile storage medium corresponding to the first RDMA message is a non-volatile storage medium that stores IO data corresponding to the SEND message.

The RDMA WRITE message may be split into a plurality of RDMA packets. It is possible that the non-volatile storage medium is not faulty when the communication interface sends first several RDMA packets, and the non-volatile storage medium is faulty when the communication interface sends last several RDMA packets. Therefore, each time the network interface card sends an RDMA packet, the network interface card first determines the first indication information and the second indication information. If the non-volatile storage medium is faulty, a subsequent RDMA packet in the RDMA WRITE message is not sent. In this case, the communication interface may directly send a constructed RDMA packet (or referred to as a forged RDMA packet) for the RDMA WRITE message. A packet sequence number of the constructed RDMA packet is consistent with a packet sequence number of the RDMA packet that is not sent in the RDMA WRITE message, to deceive the host client to receive the complete RDMA WRITE message. Alternatively, the communication interface may not send a constructed RDMA packet of the RDMA WRITE message, and may send the constructed RDMA packet when waiting for retransmission.

In a possible implementation, the processor is further configured to obtain a second piece of first indication information and a second piece of second indication information. The second piece of first indication information indicates a second identifier of a non-volatile storage medium corresponding to a second RDMA message, and the second piece of second indication information indicates whether the non-volatile storage medium corresponding to the second identifier is faulty. The communication interface is configured to send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty. A packet sequence number of an RDMA packet in the second RDMA message is a packet sequence number of a previously sent RDMA packet plus 1. For example, if a PSN of the previously sent RDMA packet is n, a PSN of the RDMA packet in the second RDMA message starts from n+1. In this way, the network interface card of the host client can always normally receive the RDMA message, to prevent the QP disconnection between the host client and the storage apparatus.

In a possible implementation, in a send queue, posting time of a work queue element corresponding to the first RDMA message is earlier than posting time of a work queue element corresponding to the second RDMA message. That is, the first RDMA message is expected to be sent before the second RDMA message. In this case, when an SSD corresponding to the previous first RDMA message is faulty, the previous first RDMA message is skipped, and the subsequent second RDMA message is sent. Alternatively, posting time of a WQE corresponding to the first RDMA message may be later than posting time of a WQE corresponding to the second RDMA message. That is, the second RDMA message is expected to be sent before the first RDMA message.

In a possible implementation, the first indication information is in a work queue element in the send queue. A parameter definition of a Verbs interface in the RDMA protocol may be extended. The first indication information may be in a work queue element that is in the send queue and that corresponds to the to-be-sent RDMA message, or the first indication information may be transferred in another manner. This is not limited in embodiments of the present disclosure.

In a possible implementation, the processor is further configured to generate third indication information. The third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent. The third indication information is mainly used by the processor to subsequently generate fourth indication information.

In a possible implementation, the processor is further configured to: post a completion queue element to a completion queue after the communication interface receives the non-acknowledge message or an acknowledge message, where the completion queue element includes the fourth indication information, and the fourth indication information indicates whether a posted work queue element is not processed because a corresponding non-volatile storage medium is faulty. A parameter definition of a Verbs interface in the RDMA protocol may be extended. The fourth indication information may be in the completion queue element, or the fourth indication information may be transferred in another manner. This is not limited in embodiments of the present disclosure. The processor may set the fourth indication information for the corresponding completion queue element based on the third indication information corresponding to each work queue element in the send queue.

According to a fourth aspect, a message sending method is provided, including: obtaining a first piece of first indication information and a first piece of second indication information, where the first piece of first indication information indicates a first identifier of a non-volatile storage medium corresponding to a first remote direct memory access RDMA message, and the first piece of second indication information indicates whether the non-volatile storage medium corresponding to the first identifier is faulty; and sending the first RDMA message when the first piece of first indication information and the first piece of second indication information indicate that the non-volatile storage medium corresponding to the first RDMA message is not faulty.

In a possible implementation, the method further includes: obtaining a second piece of first indication information and a second piece of second indication information, where the second piece of first indication information indicates a second identifier of a non-volatile storage medium corresponding to a second RDMA message, and the second piece of second indication information indicates whether the non-volatile storage medium corresponding to the second identifier is faulty; and sending the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, where a packet sequence number of an RDMA packet in the second RDMA message is a packet sequence number of a previously sent RDMA packet plus 1.

In a possible implementation, in a send queue, posting time of a work queue element corresponding to the first RDMA message is earlier than posting time of a work queue element corresponding to the second RDMA message.

In a possible implementation, the method further includes: obtaining a third piece of first indication information and a third piece of second indication information, where the third piece of first indication information indicates a third identifier of a non-volatile storage medium corresponding to a third RDMA message, and the third piece of second indication information indicates whether the non-volatile storage medium corresponding to the third identifier is faulty; receiving a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; and sending a constructed RDMA packet, where a packet sequence number of the constructed RDMA packet is consistent with the packet sequence number of the lost RDMA packet.

In a possible implementation, the first indication information is in a work queue element in the send queue.

In a possible implementation, the method further includes: generating third indication information, where the third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent.

In a possible implementation, the method further includes: posting a completion queue element to a completion queue after receiving the non-acknowledge message or an acknowledge message, where the completion queue element includes fourth indication information, and the fourth indication information indicates whether a posted work queue element is not processed because a corresponding non-volatile storage medium is faulty.

According to a fifth aspect, a sending method is provided, including: obtaining a first piece of first indication information, a first piece of second indication information, a second piece of first indication information, and a second piece of second indication information, where the first piece of first indication information indicates a first identifier of a non-volatile storage medium corresponding to a to-be-sent first RDMA message, the first piece of second indication information indicates whether the non-volatile storage medium corresponding to the first identifier is faulty, the second piece of first indication information indicates a second identifier of a non-volatile storage medium corresponding to a to-be-sent second RDMA message, and the second piece of second indication information indicates whether the non-volatile storage medium corresponding to the second identifier is faulty; and sending the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, where a packet sequence number of an RDMA packet in the second RDMA message is a packet sequence number of a previously sent RDMA packet plus 1.

In a possible implementation, in a send queue, posting time of a work queue element corresponding to the first RDMA message is earlier than posting time of a work queue element corresponding to the second RDMA message.

In a possible implementation, the method further includes: obtaining a third piece of first indication information and a third piece of second indication information, where the third piece of first indication information indicates a third identifier of a non-volatile storage medium corresponding to a third RDMA message, and the third piece of second indication information indicates whether the non-volatile storage medium corresponding to the third identifier is faulty; receiving a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; and sending a constructed RDMA packet, where a packet sequence number of the constructed RDMA packet is consistent with the packet sequence number of the lost RDMA packet.

In a possible implementation, the first indication information is in a work queue element in the send queue.

In a possible implementation, the method further includes: generating third indication information. The third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent.

In a possible implementation, the method further includes: posting a completion queue element to a completion queue after receiving the non-acknowledge message or an acknowledge message, where the completion queue element includes fourth indication information, and the fourth indication information indicates whether a posted work queue element is not processed because a corresponding non-volatile storage medium is faulty.

According to a sixth aspect, a message sending method is provided, including: obtaining a first piece of first indication information, a first piece of second indication information, a third piece of first indication information, and a third piece of second indication information, where the first piece of first indication information indicates a first identifier of a non-volatile storage medium corresponding to a first RDMA message, the first piece of second indication information indicates whether the non-volatile storage medium corresponding to the first identifier is faulty, the third piece of first indication information indicates a third identifier of a non-volatile storage medium corresponding to a to-be-sent third RDMA message, and the third piece of second indication information indicates whether the non-volatile storage medium corresponding to the third identifier is faulty; sending the first RDMA message when the first piece of first indication information and the first piece of second indication information indicate that the non-volatile storage medium corresponding to the first RDMA message is not faulty; receiving a non-acknowledge message, where the non-acknowledge message indicates a packet sequence number of a lost RDMA packet, the lost RDMA packet corresponds to the third RDMA message, and the third piece of first indication information and the third piece of second indication information indicate that the non-volatile storage medium corresponding to the third RDMA message is faulty; and sending a constructed RDMA packet, where a packet sequence number of the constructed RDMA packet is consistent with the packet sequence number of the lost RDMA packet.

In a possible implementation, the method further includes: obtaining a second piece of first indication information and a second piece of second indication information, where the second piece of first indication information indicates a second identifier of a non-volatile storage medium corresponding to a second RDMA message, and the second piece of second indication information indicates whether the non-volatile storage medium corresponding to the second identifier is faulty; and sending the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, where a packet sequence number of an RDMA packet in the second RDMA message is a packet sequence number of a previously sent RDMA packet plus 1.

In a possible implementation, in a send queue, posting time of a work queue element corresponding to the first RDMA message is earlier than posting time of a work queue element corresponding to the second RDMA message.

In a possible implementation, the first indication information is in a work queue element in the send queue.

In a possible implementation, the method further includes: generating third indication information, where the third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent.

In a possible implementation, the method further includes: posting a completion queue element to a completion queue after receiving the non-acknowledge message or an acknowledge message, where the completion queue element includes fourth indication information, and the fourth indication information indicates whether a posted work queue element is not processed because a corresponding non-volatile storage medium is faulty.

According to a seventh aspect, a storage apparatus is provided, including a network interface card, a processor, and a plurality of non-volatile storage media. The processor is configured to generate a first piece of first indication information and a first piece of second indication information in response to an input/output IO read command from a host client. The first piece of first indication information indicates a first identifier of a non-volatile storage medium corresponding to a first remote direct memory access RDMA message, and the first piece of second indication information indicates whether the non-volatile storage medium corresponding to the first identifier is faulty. The network interface card is configured to: obtain the first piece of first indication information and the first piece of second indication information; and send the first RDMA message when the first piece of first indication information and the first piece of second indication information indicate that the non-volatile storage medium corresponding to the first RDMA message is not faulty.

In a possible implementation, the processor is further configured to generate a second piece of first indication information and a second piece of second indication information. The second piece of first indication information indicates a second identifier of a non-volatile storage medium corresponding to a second RDMA message, and the second piece of second indication information indicates whether the non-volatile storage medium corresponding to the second identifier is faulty. The network interface card is further configured to: obtain the second piece of first indication information and the second piece of second indication information; and send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty. A packet sequence number of an RDMA packet in the second RDMA message is a packet sequence number of a previously sent RDMA packet plus 1.

In a possible implementation, in a send queue, posting time of a work queue element corresponding to the first RDMA message is earlier than posting time of a work queue element corresponding to the second RDMA message.

In a possible implementation, the apparatus further includes: the processor, further configured to generate a third piece of first indication information and a third piece of second indication information, where the third piece of first indication information indicates a third identifier of a non-volatile storage medium corresponding to a third RDMA message, and the third piece of second indication information indicates whether the non-volatile storage medium corresponding to the third identifier is faulty; and the network interface card, further configured to: obtain the third piece of first indication information and the third piece of second indication information; receive a non-acknowledge message, where the non-acknowledge message indicates a packet sequence number of a lost RDMA packet, and the lost RDMA packet corresponds to the third RDMA message; and send a constructed RDMA packet, where a packet sequence number of the constructed RDMA packet is consistent with the packet sequence number of the lost RDMA packet.

In a possible implementation, the first indication information is in a work queue element in the send queue.

In a possible implementation, the network interface card is further configured to: generate third indication information, where the third indication information indicates whether a fourth RDMA message corresponding to a work queue element in the send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent.

In a possible implementation, the network interface card is further configured to: post a completion queue element to a completion queue after receiving the non-acknowledge message or an acknowledge message, where the completion queue element includes fourth indication information, and the fourth indication information indicates whether a posted work queue element is not processed because a corresponding non-volatile storage medium is faulty.

In a possible implementation, the network interface card and the processor are located in a same chip.

According to an eighth aspect, a message sending method is provided, including generating a first piece of first indication information and a first piece of second indication information in response to an input/output IO read command from a host client, where the first piece of first indication information indicates a first identifier of a non-volatile storage medium corresponding to a first remote direct memory access RDMA message, and the first piece of second indication information indicates whether the non-volatile storage medium corresponding to the first identifier is faulty; and sending the first RDMA message when the first piece of first indication information and the first piece of second indication information indicate that the non-volatile storage medium corresponding to the first RDMA message is not faulty.

In a possible implementation, the method further includes: generating a second piece of first indication information and a second piece of second indication information, where the second piece of first indication information indicates a second identifier of a non-volatile storage medium corresponding to a second RDMA message, and the second piece of second indication information indicates whether the non-volatile storage medium corresponding to the second identifier is faulty; and sending the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, where a packet sequence number of an RDMA packet in the second RDMA message is a packet sequence number of a previously sent RDMA packet plus 1.

In a possible implementation, in a send queue, posting time of a work queue element corresponding to the first RDMA message is earlier than posting time of a work queue element corresponding to the second RDMA message.

In a possible implementation, the method further includes: generating a third piece of first indication information and a third piece of second indication information, where the third piece of first indication information indicates a third identifier of a non-volatile storage medium corresponding to a third RDMA message, and the third piece of second indication information indicates whether the non-volatile storage medium corresponding to the third identifier is faulty; receiving a non-acknowledge message, where the non-acknowledge message indicates a packet sequence number of a lost RDMA packet, and the lost RDMA packet corresponds to the third RDMA message; and sending a constructed RDMA packet, where a packet sequence number of the constructed RDMA packet is consistent with the packet sequence number of the lost RDMA packet.

In a possible implementation, the first indication information is in a work queue element in the send queue.

In a possible implementation, the method further includes: generating third indication information, where the third indication information indicates whether a fourth RDMA message corresponding to a work queue element in a send queue is sent; and when the fourth RDMA message is sent and a corresponding non-volatile storage medium is not faulty, the third indication information indicates that the fourth RDMA message is sent; or when a non-volatile storage medium corresponding to the fourth RDMA message is faulty, the third indication information indicates that the fourth RDMA message is not sent.

In a possible implementation, the method further includes: posting a completion queue element to a completion queue after receiving the non-acknowledge message or an acknowledge message, where the completion queue element includes fourth indication information, and the fourth indication information indicates whether a posted work queue element is not processed because a corresponding non-volatile storage medium is faulty.

According to a ninth aspect, a computer-readable storage medium storing one or more programs is provided. The one or more programs include instructions. When the instructions are executed by a network interface card, the network interface card is enabled to perform the method according to any one of the fourth aspect to the sixth aspect and the implementations of the fourth aspect to the sixth aspect, or when the instructions are executed by a storage apparatus, the storage apparatus is enabled to perform the method according to the eighth aspect and any one of implementations of the eighth aspect.

According to a tenth aspect, a computer program product including instructions is provided. When the instructions are executed by a network interface card, the network interface card is enabled to perform the method according to any one of the fourth aspect to the sixth aspect and the implementations of the fourth aspect to the sixth aspect, or when the instructions are executed by a storage apparatus, the storage apparatus is enabled to perform the method according to the eighth aspect and any one of implementations of the eighth aspect.

For technical effects of the fourth aspect, the seventh aspect, the eighth aspect, and any one of implementations of the fourth aspect, the seventh aspect, and the eighth aspect, refer to technical effects of the first aspect and any one of implementations of the first aspect. For technical effects of the fifth aspect and any one of implementations of the fifth aspect, refer to technical effects of the second aspect and any one of implementations of the second aspect. For technical effects of the sixth aspect and any one of implementations of the sixth aspect, refer to technical effects of the third aspect and any one of implementations of the third aspect. For technical effects of the ninth aspect and the tenth aspect, refer to technical effects of any one of the first aspect to the third aspect and the implementations of the first aspect to the third aspect.

DESCRIPTION OF EMBODIMENTS

As used in the present disclosure, terms "component", "module", "system", and the like are intended to refer to a computer-related entity, and the computer-related entity may be hardware, firmware, a combination of hardware and software, software, or software in operation. For example, a component may be, but is not limited to, a process running on a processor, a processor, an object, an executable file, a thread of execution, a program, and/or a computer. In an example, both an application running on a computing device and the computing device may be components. One or more components may reside within a process and/or a thread of execution, and the components may be located on one computer and/or distributed between two or more computers. In addition, these components can be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network like the Internet by using a signal).

Terms "first", "second", "third", "a first . . . ", "a second . . . ", "a third . . . ", and the like in embodiments of the present disclosure are merely used for description purposes, and cannot be understood as an indication or implication of relative importance, or an implicit indication of a quantity or order of indicated technical features. Therefore, a feature limited by "first", "second", "third", "a first . . . ", "a second . . . ", "a third . . . ", or the like may explicitly or implicitly include one or more features.

"A/B" in embodiments of the present disclosure means that there may be either A or B.

Concepts involved in the present disclosure are first described.

Figure 1:
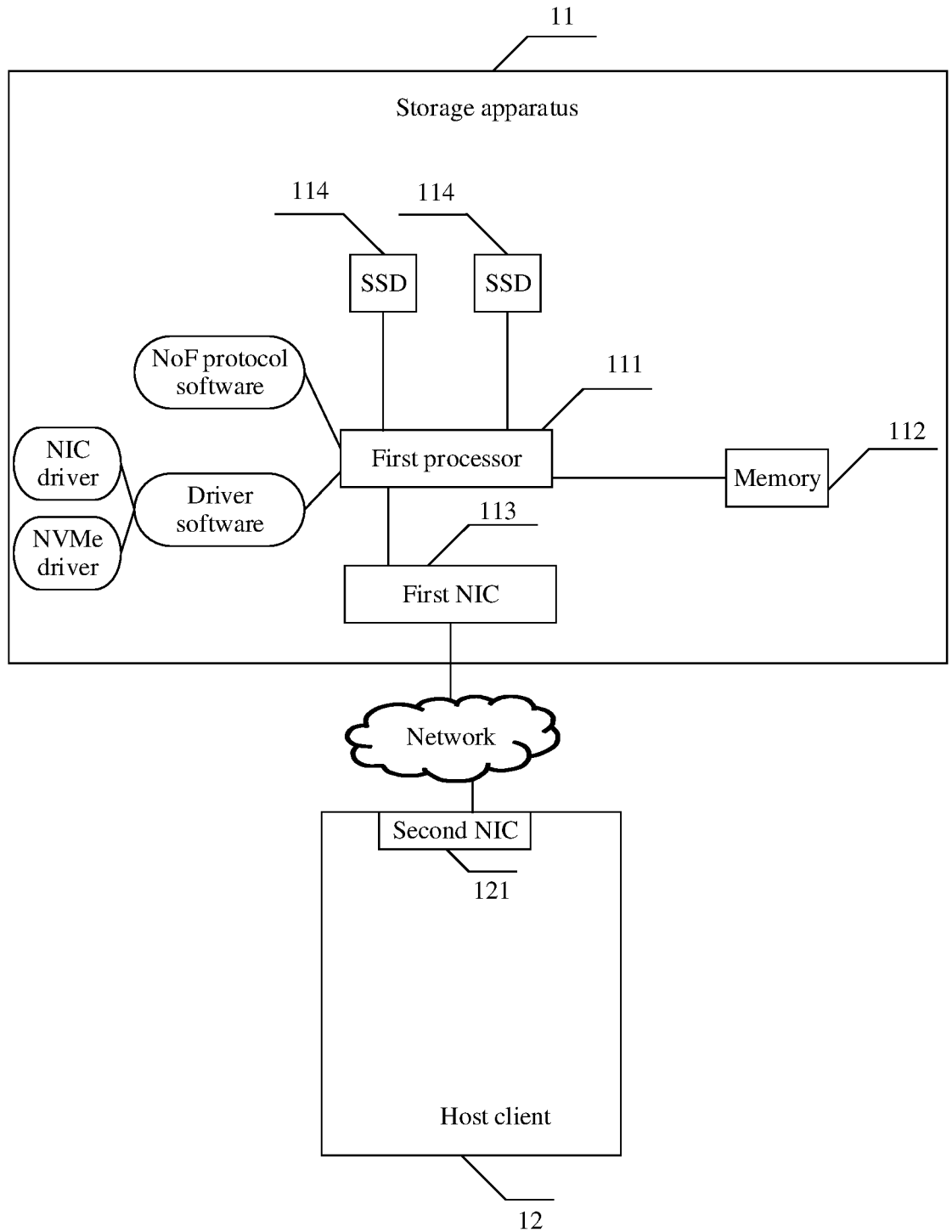
FIG. 1 is a schematic diagram of an architecture of a storage system according to an embodiment of the present disclosure.

As shown in FIG. 1, in an RDMA-based storage system, a storage apparatus 11 includes a first processor (for example, a central processing unit (CPU)) 111, a memory (for example, a double data rate (DDR) memory) 112 connected to the first processor 111, a first network interface card (NIC) 113, and non-volatile storage media (for example, solid state drives (SSDs) 114). The first processor 111 and the first NIC 113 may be located in a same chip. For example, the chip may be a controller having a network interface. A host client includes a second NIC 121.

The first processor 111 in the storage apparatus 11 may be connected to the memory 112, the first NIC 113, and the non-volatile storage media (for example, the SSDs 114) through a peripheral component interconnect express (PCIe) interface. Connections between the first processor 111 and each of the memory 112, the first NIC 113, and the non-volatile storage media (for example, the SSDs 114) may also support another host interface standard. The first processor 111 and the first NIC 113 may also be integrated into a system on chip (SoC). The first processor 111 in the storage apparatus 11 may obtain a read request from a host client 12 by using the first NIC 113, and read IO data from the non-volatile storage media. Then the first NIC 113 returns the IO data to the host client 12. The first processor 111 in the storage apparatus 11 may further obtain a write request and IO data from the host client 12 by using the first NIC 113, and write the IO data to the non-volatile storage media.

Software running in the first processor 111 includes driver software and NoF protocol software (which may also be referred to as an NoF protocol stack) by layers. Optionally, the software may further include open fabrics enterprise distribution (OFED) software. The driver software provides an interface for upper-layer software to control the NIC. The NoF protocol software implements an NoF protocol control function and an IO read and write function. The OFED software is a group of open-source driver software, core kernel code, middleware, and a user-level interface program that supports infiniband fabric. The driver software may include an NIC driver and an NVMe driver. The NIC driver is configured to provide an access interface of an NIC device, and the NVMe driver is configured to provide an access interface of an NVMe device.

The storage apparatus in embodiments of the present disclosure may be referred to as a storage server, a storage array, a blade server, or the like, and a name is not limited.

The NIC in embodiments of the present disclosure may be a chip. For example, the chip may be a field programmable gate array (FPGA), an application-specific integrated chip (ASIC), a system on chip (SoC), a central processing unit (CPU), a network processor (NP), a digital signal processing circuit (digital signal processor, DSP), a microcontroller (micro controller unit, MCU), a programmable logic device (PLD), or another integrated chip.

In embodiments of the present disclosure, the memory configured to store software running in the first processor 111 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through an example but not a limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories of the systems and methods described in the text are intended to include, but are not limited to these and any other suitable types of memories.

The NIC in embodiments of the present disclosure may also be referred to as a network interface controller, a network adapter, a network interface card, or a local area network adapter (LAN adapter), and is a computer hardware designed to allow a computer to communicate on a computer network.

The storage apparatus is connected to the host client through a network, and may provide a data storage service for a plurality of host clients. As NVMe SSDs emerge, a protocol used by the host client to access the storage apparatus transits from a small computer system interface (SCSI) to an NVMe. Correspondingly, the network also migrates from a fibre channel (FC) network and a transmission control protocol/Internet protocol (TCP/IP) network to an NoF network.

An NoF protocol supports operations of a memory type and a message type. A PCIe supports operations of a memory type, an FC supports operations of a message type, and RDMA supports operations of a memory type and a message type.

The RDMA may use data in storage space of the storage apparatus as a message and transmit the message to storage space of the host client in a form of an RDMA packet through a network, or use data in storage space of the host client as a message and transmit the message to storage space of the storage apparatus in a form of an RDMA packet through a network. Transmission and copy work is mainly performed by a network interface card (for example, an RDMA network interface card (RNIC) in the host client) in the storage apparatus and the host client, and does not need to be performed by a processor in the host client. Therefore, the performance of the host client is not affected.

Currently, implementations of hardware of the RDMA include Infiniband (IB), RDMA over converged ethernet (RoCE) (including RoCEv1 and RoCEv2), an Internet wide area RDMA protocol (iWARP), and the like. The Infiniband is a network designed specially for the RDMA to ensure reliable transmission at a hardware level. The ROCE and iWARP are Ethernet-based RDMA technologies and support corresponding verbs interfaces. RoCE also supports hardware-level reliable transmission.

Figure 2:
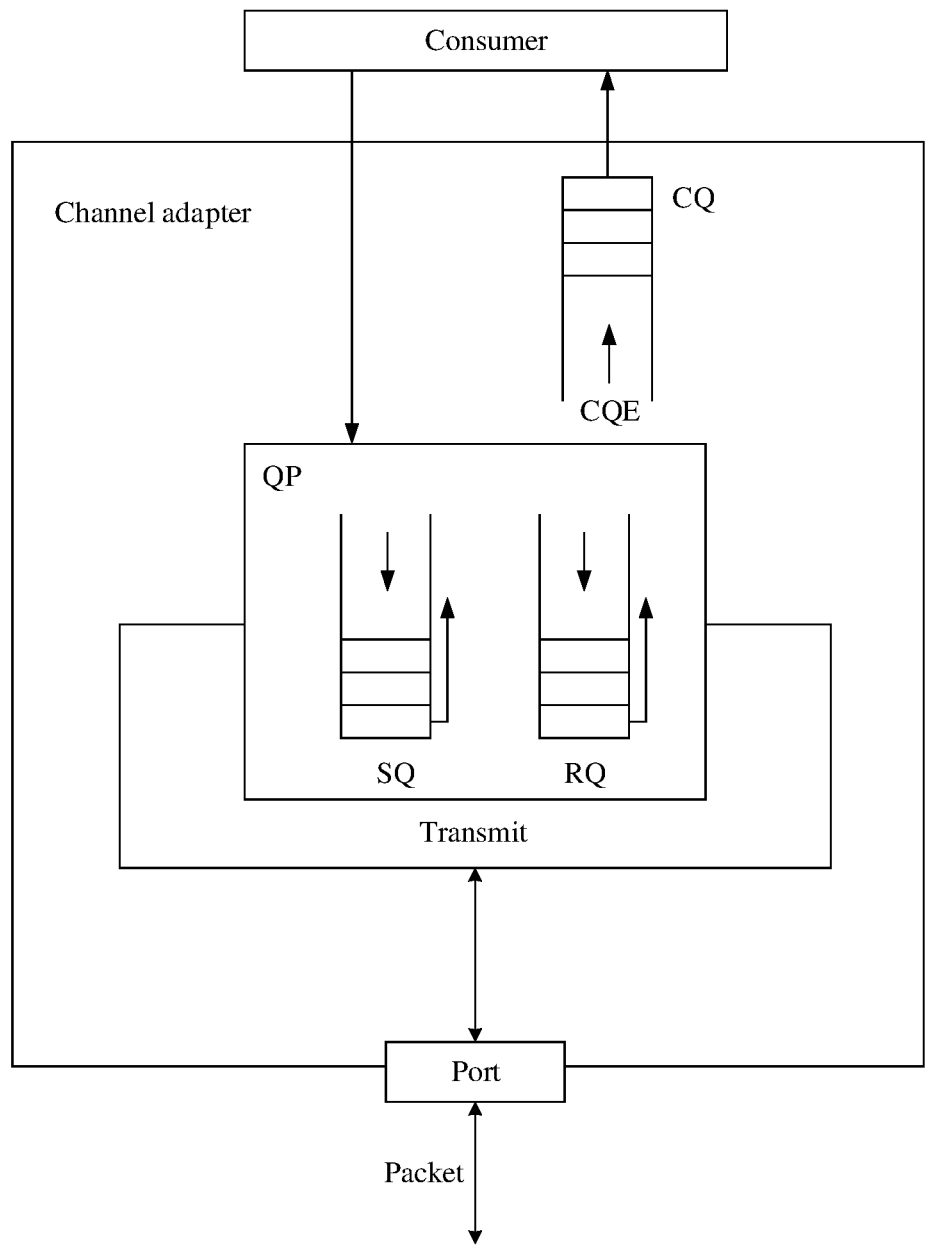
FIG. 2 is a schematic diagram of a QP according to an embodiment of the present disclosure.

As shown in FIG. 2, RDMA is a transport layer network protocol that uses a queue pair (QP) to implement sending and receiving of data (as a message) of a consumer (corresponding to the first processor 111 in FIG. 1) in a channel adapter (CA) (corresponding to the first NIC 113 in FIG. 1). Each QP includes a send queue (SQ) and a receive queue (RQ). The SQ is responsible for sending a message, and the RQ is responsible for receiving a message. The SQ and RQ of each QP can be associated with one completion queue (CQ). Each QP has connection context of the QP for maintaining a connection status of the QP. The SQ, RQ, and CQ have queue context of the SQ, RQ, and CQ for maintaining queue usage statuses of the SQ, RQ, and CQ.

The consumer in embodiments of the present disclosure refers to an entity that uses a QP to receive and send a message, and generally refers to a software process, for example, the NoF protocol software running in the first processor 111.

When sending a message, the consumer posts a work queue element (WQE) to an SQ in a QP of a local node (as a requester). The WQE includes an RDMA operation type, an address pointing to storage space of the to-be-transmitted message, and a size of the to-be-transmitted message. To-be-transmitted data is used as an RDMA message. A length of the RDMA message may be 0 bytes to 2 G bytes. The network interface card segments (segmented), based on a path maximum transmission unit (PMTU), the to-be-transmitted data pointed to by the WQE to obtain an RDMA packet, and sends the packet to a network. After the network interface card completes transmission of all content of a message pointed to by the WQE, the network interface card posts a completion queue element (CQE) to a CQ associated with the SQ to notify the consumer that an RDMA operation indicated by a WQE posted by the consumer is completed.

For receiving of a SEND message: Before receiving a message, the consumer posts in advance one WQE to an RQ in a QP of the local node (as a responder). The WQE includes a pointer of storage space that can store data and a size of the storage space that can store data. The network interface card receives data from a network and writes the data to storage space to which the WQE of the RQ points. After receiving the data, the network interface card posts a CQE to a CQ associated with the RQ, to notify the consumer that the network interface card completes receiving an RDMA message. For receiving of an RDMA READ response message: The network interface card writes the received data to storage space pointed to by a WQE of a corresponding RDMA READ operation. For receiving of a tail packet or a single packet of the RDMA READ response message: After the network interface card completes receiving the data, the network interface card posts a CQE to a CQ associated with the SQ, to notify the consumer that an RDMA READ operation indicated by a WQE posted by the consumer is completed. For receiving of an acknowledge (ACK) message/a non-acknowledge (NAK) message of an RDMA WRITE message or a SEND message: The network interface card posts a CQE to a CQ associated with the SQ, to notify the consumer that an RDMA WRITE operation or an RDMA SEND operation indicated by a WQE posted by the consumer is completed. For details about the acknowledge (ACK) message/non-acknowledge (NAK) message of the SEND message, the RDMA READ response message, and the RDMA WRITE message, refer to the following description.

Figure 3A:
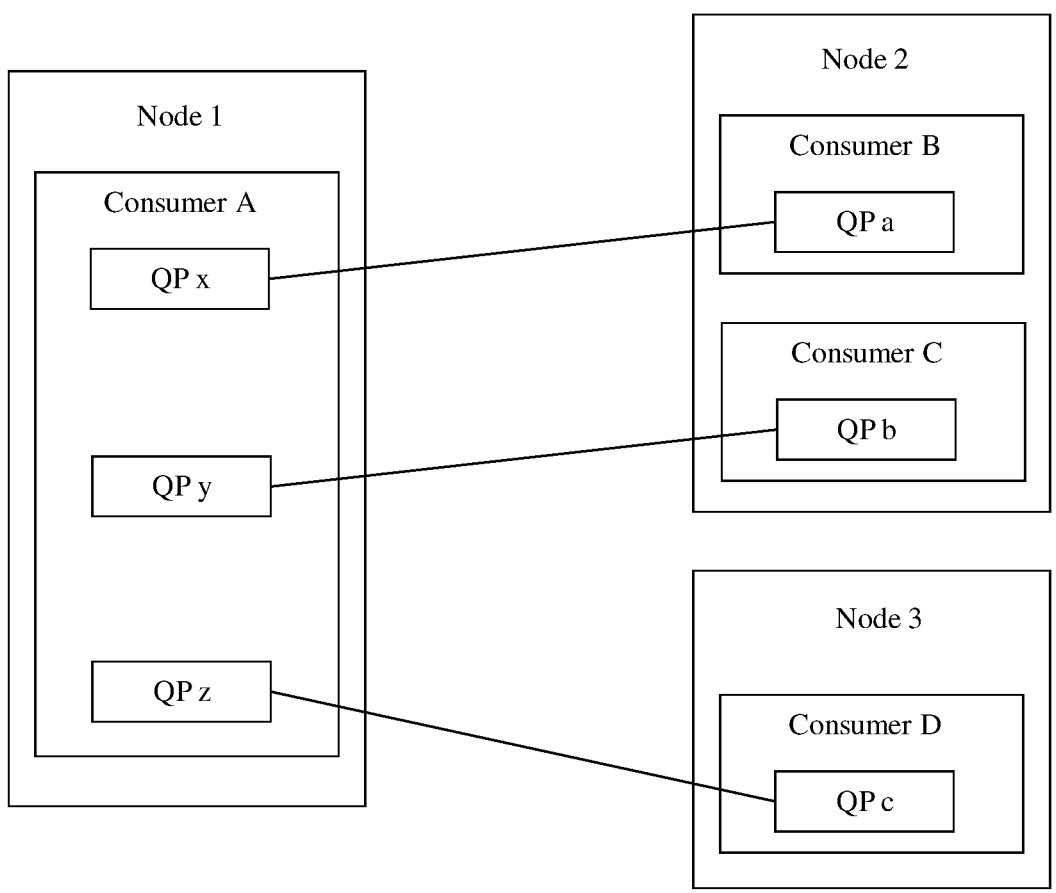
FIG. 3A is a schematic diagram of a QP connection of a reliable connection according to an embodiment of the present disclosure.
Figure 3B:
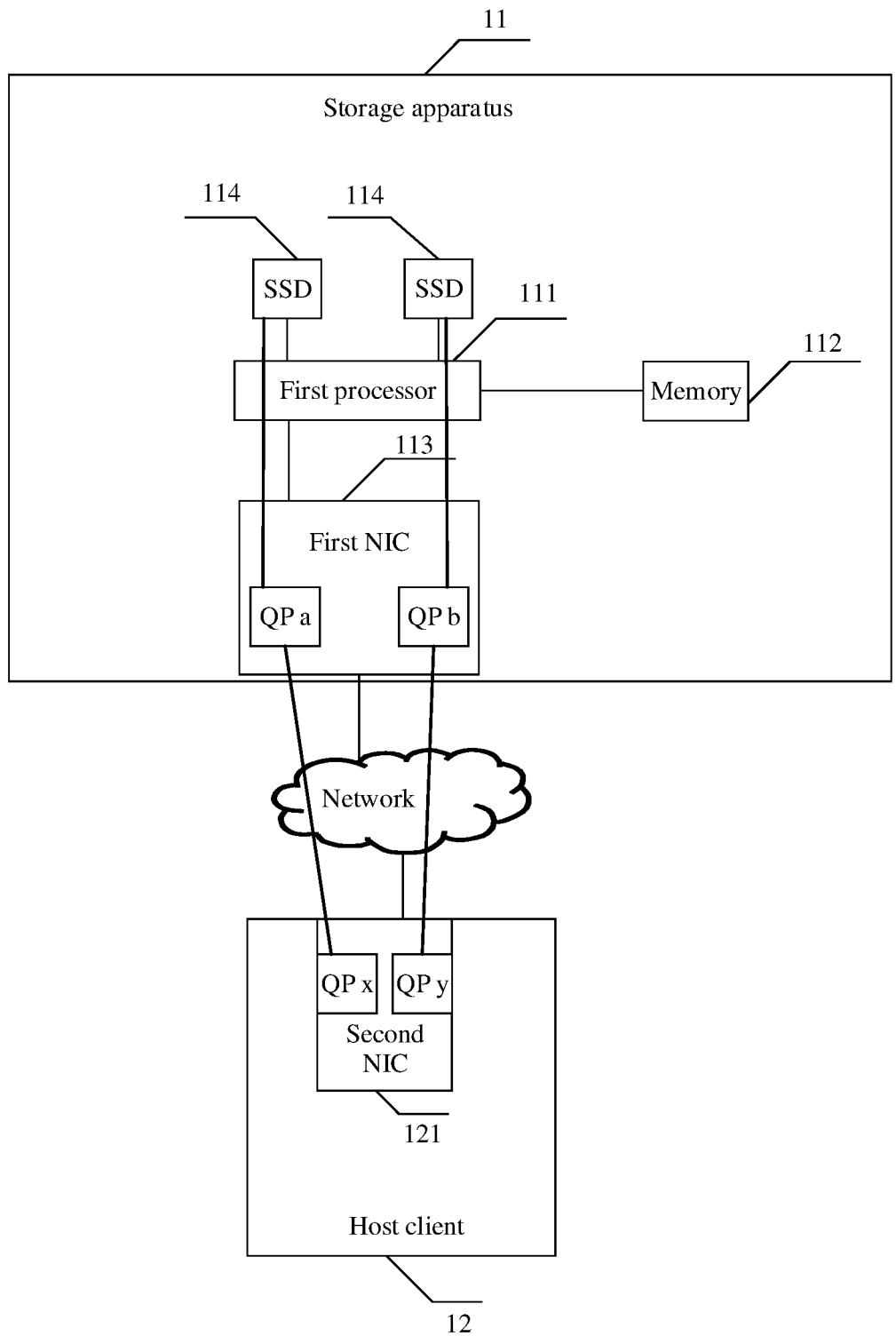
FIG. 3B is a schematic diagram of another QP connection of a reliable connection according to an embodiment of the present disclosure.
Figure 3C:
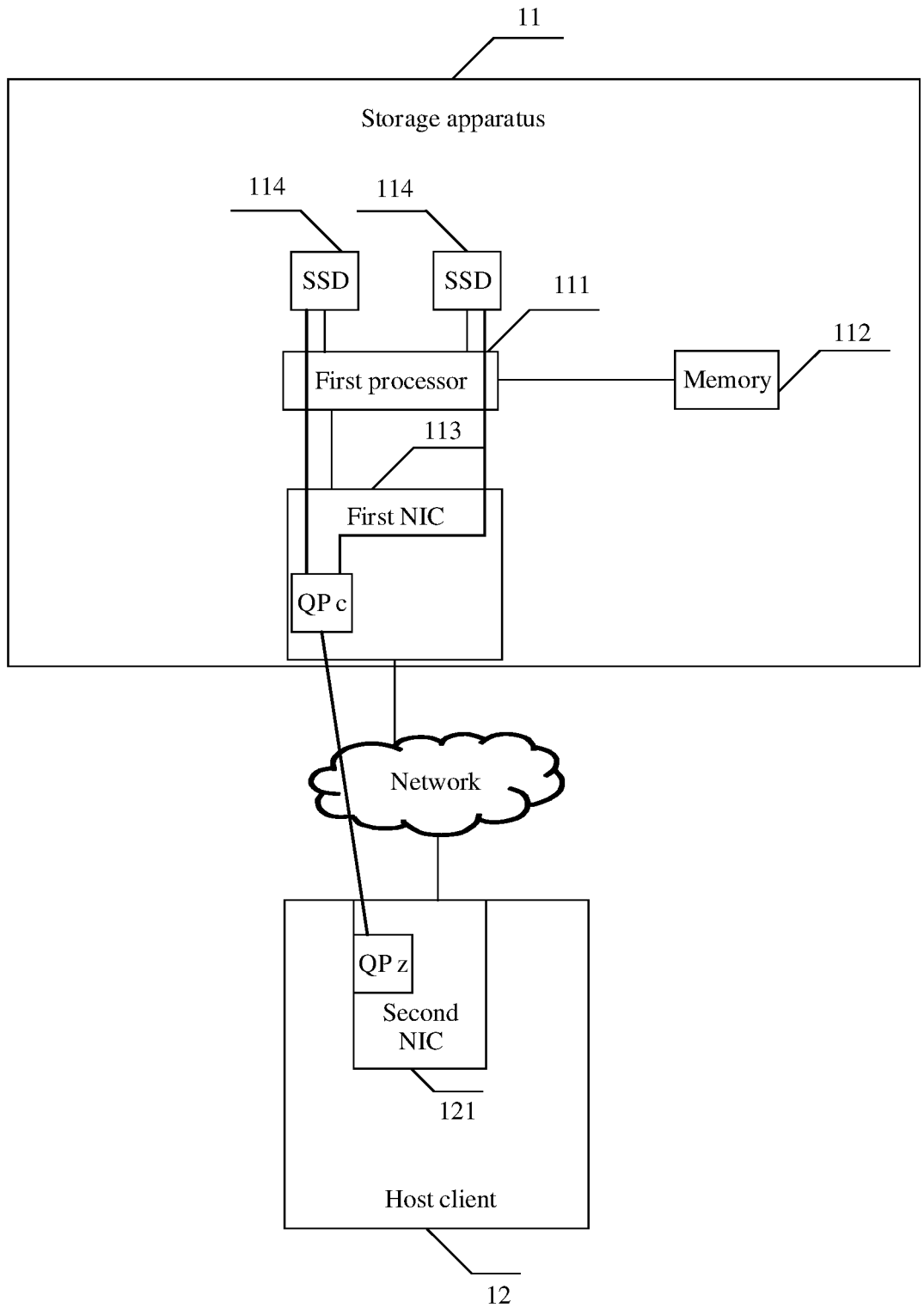
FIG. 3C is a schematic diagram of still another QP connection of a reliable connection according to an embodiment of the present disclosure.

The RDMA supports a QP connection of a reliable connection and a QP connection of an unreliable connection. The QP connection of a reliable connection supports only a one-to-one communication model. To be specific, one QP on one node can establish a QP connection to only one QP of another node, and no QP can establish QP connections to a plurality of QPs of another node at the same time. For example, as shown in FIG. 3A, a QP x of a consumer A on a node 1 establishes a QP connection to a QP a of a consumer B on a node 2, a QP y of the consumer A on the node 1 establishes a QP connection to a QP b of a consumer C on the node 2, a QP z of the consumer A on the node 1 establishes a QP connection to a QP c of a consumer D on a node 3, and the QP x of the consumer A on the node 1 cannot establish a QP connection to another QP (for example, the QPb and the QP c). NoF communicates by using RDMA that supports a QP connection of a reliable connection. As shown in FIG. 3B that corresponds to the storage system in FIG. 1, a QP x in a second NIC 121 of a host client 12 establishes a QP connection to a QP a in a first NIC 113 of a storage apparatus 11, and a QP y in the second NIC 121 of the host client 12 establishes a QP connection to a QP b in the first NIC 113 of the storage apparatus 11. One QP connection is used to access one non-volatile storage medium. When a scale of the host client 12 is large, there are too many QP connections. As shown in FIG. 3C, a QP z in a second NIC 121 of a host client 12 establishes a QP connection to a QP c in a first NIC 113 of a storage apparatus 11. One QP connection may provide access services for a plurality of non-volatile storage media. The storage apparatus 11 in the present disclosure is described by using the scenario in FIG. 3C as an example.

A packet that is of a QP connection of a reliable connection and received in RDMA should comply with a strictly monotonic increasing requirement. A responder determines, based on whether packet sequence numbers (PSN) of successively received packets are strictly monotonically increasing, whether to receive the packets. As shown in A in FIG. 4, a responder receives packets only when PSNs of the packets increase strictly (for example, the PSNs of the packets are successively equal to n, n+1, n+2, and n+3), and may feed back an acknowledge (ACK) message for each packet or feed back one acknowledge (ACK) message for a plurality of consecutive packets. As shown in B in FIG. 4, when a PSN of a packet changes (for example, a PSN n+2 of a packet is missing), that is, when a packet of a PSN is lost, a responder discards all subsequent packets whose PSNs do not increase strictly, and feeds back a non-acknowledge (NAK) message, and a requester retransmits the lost packets based on the PSNs. As shown in C in FIG. 4, if a receiver continuously loses packets from a specific PSN, a requester continuously retransmits the lost packets, and a responder continuously feeds back a non-acknowledge (NAK) message until a maximum quantity of retransmission times is reached. In this case, it may be considered that a network fault occurs between the requester and the responder, and a QP connection between the requester and the responder is disconnected. As shown in D in FIG. 4, when a PSN of a packet is the same as a PSN of a received packet (for example, a packet whose PSN is n+1 is repeatedly received), a responder discards the repeated packet, and does not need to feed back a non-acknowledge (NAK) message.

An operation that is of a message type and supported by RDMA includes a send operation (SEND operation), and the operation relates to a processor and is applicable to transmission of a control message (or referred to as a command message).

An operation that is of a memory type and supported by RDMA includes an RDMA read operation and an RDMA write operation. These operations do not relate to a processor, and data reading or writing is completed by operating storage space by using a network interface card. The operations are applicable to transmission of a data message.

The following separately describes the send operation, the RDMA read operation, and the RDMA write operation.

Send Operation

The send operation may also be referred to as a push operation or an operation having channel semantics. A requester pushes data to a responder without needing to know a storage location of the data in the responder. A channel adapter on the responder places the data into next available storage space of a QP of the responder. The storage space is indicated by a WQE at the head in an RQ of the QP.

The requester can send a SEND message to initiate a send operation. The message includes the data to be pushed to the responder. A length of the data may range from 0 bytes to $2^{31}$ (2 G) bytes. If the length of the data is greater than a path maximum transmission unit (PMTU), the data is segmented into a plurality of packets based on the PMTU. The responder reassembles the packets to obtain the data. For a reliable connection, if data is a short message (that is, the data does not need to be segmented into a plurality of packets), the responder sends an acknowledge (ACK) message/a non-acknowledge (NAK) message to the requester for each packet; and if the data is a long message (that is, the data is segmented into a plurality of packets), the responder may send an acknowledge (ACK) message/a non-acknowledge (NAK) message to the requester for each packet, or send one acknowledge (ACK) message to the requester for a plurality of consecutive packets of a same message; or send an acknowledge (ACK) message to the requester for a tail packet of the message. In addition, regardless of whether the data is a short message or a long message, the responder may send one acknowledge (ACK) message for a plurality of previously received packets. For example, an acknowledge (ACK) message of a SEND message whose PSN is X may be used to confirm that a message whose PSN is smaller than X before the SEND message is successfully received by the responder.

Each SEND message may include four-byte immediate data (ImmDt). If immediate data needs to be included, the immediate data is included in an additional header field of a last packet of the SEND message (an immediate extended transport header or an ImmDt field).

Figure 5A:
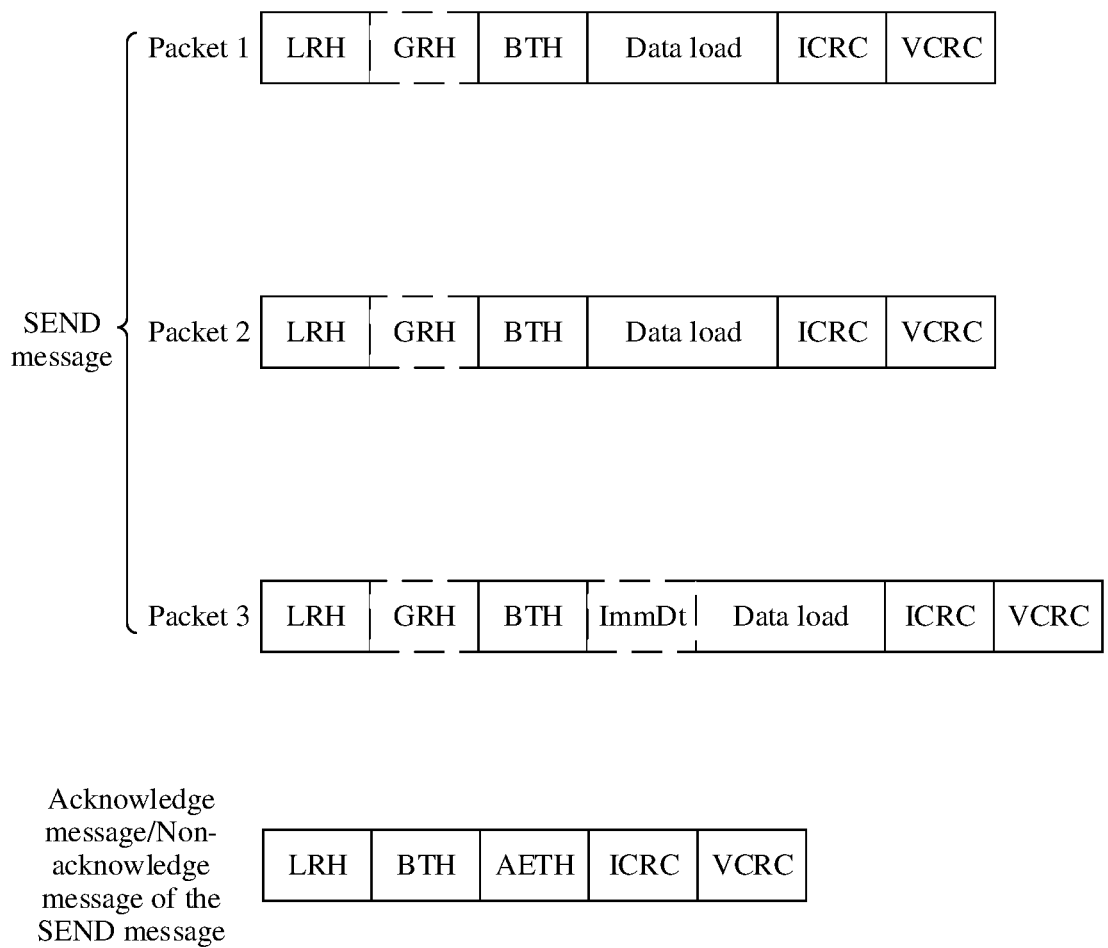
FIG. 5A is a schematic diagram of structures of a SEND message based on the IB protocol and an acknowledge message/a non-acknowledge message of the SEND message according to an embodiment of the present disclosure.
Figure 5B:
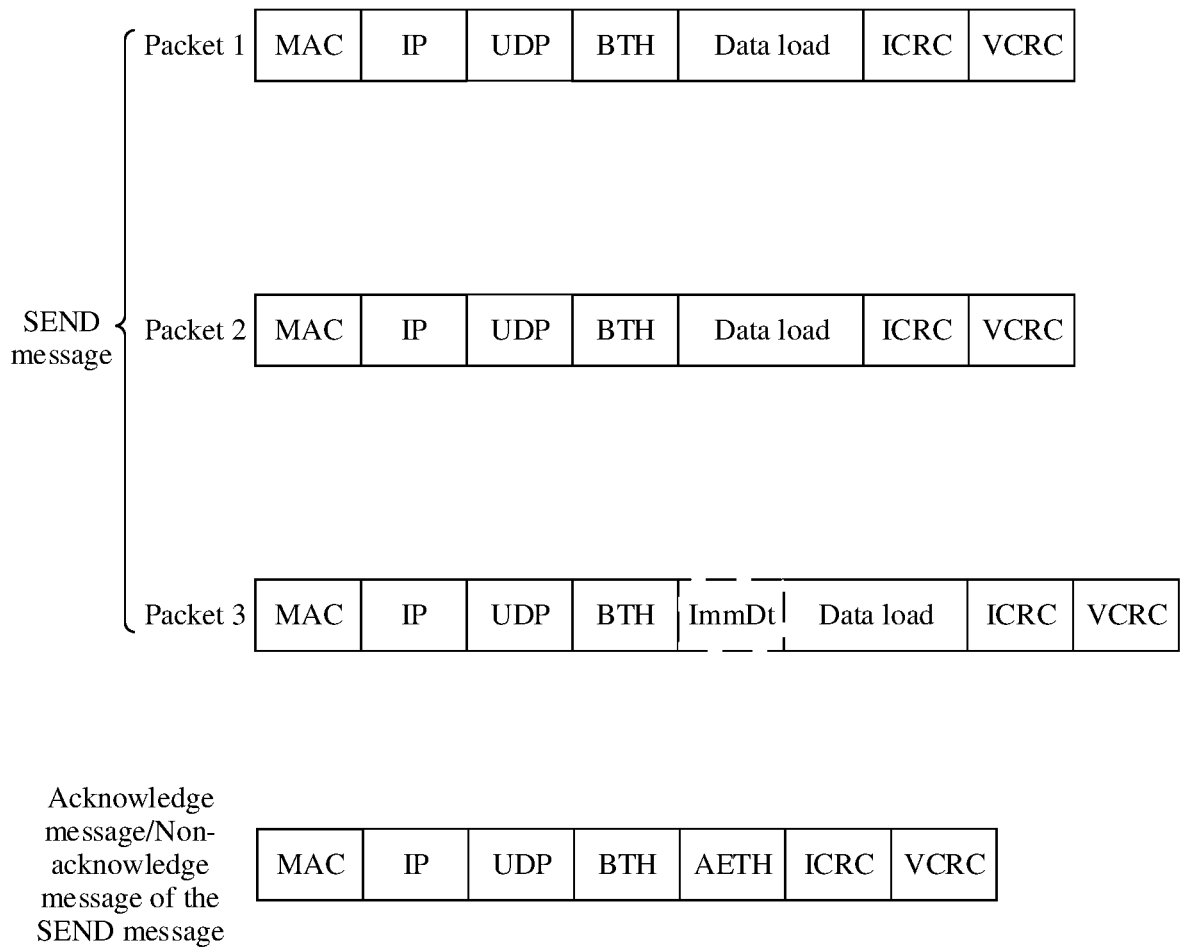
FIG. 5B is a schematic diagram of structures of a SEND message based on the RoCEv2 protocol and an acknowledge message/a non-acknowledge message of the SEND message according to an embodiment of the present disclosure.
Figure 6:
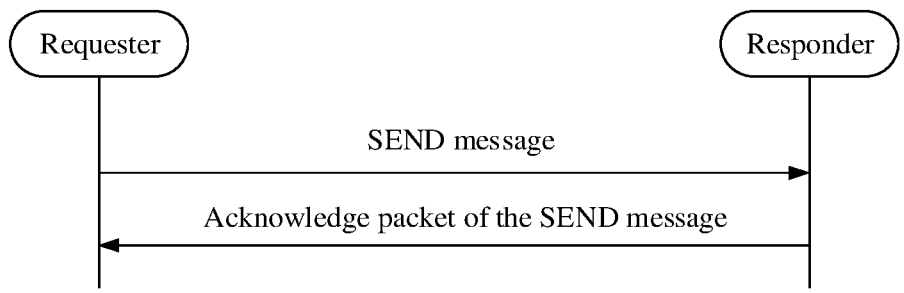
FIG. 6 is a schematic diagram of a process of interaction between a requester and a responder of a reliable connection according to an embodiment of the present disclosure.

For example, if the SEND message is segmented into three packets, structures of the SEND message based on the IB protocol and an acknowledge (ACK) message/a non-acknowledge (NAK) message of the SEND message are shown in FIG. 5A, structures of the SEND message based on the RoCEv2 protocol and an acknowledge (ACK) message/a non-acknowledge (NAK) message of the SEND message are shown in FIG. 5B, and a process of interaction between a requester and a responder of a reliable connection is shown in FIG. 6.

A local route header (LRH) field is used to perform routing by using a switch in a subnet.

A global route header (GRH) field is used to route to a destination outside a local subnet of a sender.

An invariant CRC (ICRC) field covers all fields that should not be changed in a packet, and CRC is performed on these fields.

A variant CRC (VCRC) field covers all fields of a packet, and CRC is performed on these fields.

An acknowledge extended transport header (ACK extended transport header, AETH) includes an additional transport field of an acknowledge (ACK) message/a non-acknowledge (NAK) message, and the ACK extended transport header is included in each acknowledge (ACK) message/non-acknowledge (NAK) message of a SEND message.

A media access control (MAC) field is used for Layer 2 forwarding by using a switch in an Ethernet subnet.

An internet protocol (IP) field is used for Layer 3 forwarding by using a switch.

A user datagram protocol (UDP) field is used to indicate that a payload of a packet is an RDMA message.

A base transport header (BTH) field is used to indicate a destination QP, an operation code, a packet sequence number (PSN), and a partition. An operation code field (OpCode field) in the BTH field determines the start and end of a SEND message.

For the SEND message, if a length of data is less than or equal to a PMTU, a BTH operation code "SEND Only" or "SEND Only with Immediate" is used, indicating that the message cannot be split (that is, the message is a single packet).

If the length of the data is zero, the BTH operation code "SEND Only" or "SEND Only with Immediate" is used, and a data load field does not exist in the message. If a SEND message whose BTH operation code is "SEND Only", other fields are shown in a packet 1 in FIG. 5A or FIG. 5B. If a SEND message whose BTH operation code is "SEND Only with Immediate", other fields are shown in a packet 3 in FIG. 5A or FIG. 5B.

If the length of the data is greater than the PMTU, a BTH operation code of a first packet is "SEND First", indicating that the packet is a first packet; a BTH operation code of a middle packet is "SEND Middle", indicating that the packet is a middle packet; and a BTH operation code of a last packet is "SEND Last" or "SEND Last with Immediate", indicating that the packet is a tail packet.

For an acknowledge (ACK) message or a non-acknowledge (NAK) message of the SEND message, a BTH operation code is "Acknowledge".

For a given QP of the requester, once a send operation of a plurality of packets is started, no other SEND message, RDMA WRITE message, or RDMA READ request message can be sent before a packet whose operation code is "SEND Last" or "SEND Last with Immediate".

The responder does not know a final length of the data until a last packet with an operation code "SEND Last" or "SEND Last with Immediate" arrives.

It should be noted that, after completing receiving of a single packet or a tail packet of the SEND message, the responder reports a CQE to a CQ associated with an RQ of a local node, and after completing a send procedure of a send operation (receiving of an acknowledge (ACK) message corresponding to the single packet or the tail packet of the SEND message), the requester posts a CQE to a CQ associated with an SQ of a local node.

RDMA Write Operation

The RDMA write operation is used by a requester to write data to storage space of a responder.

Before the requester is allowed to perform the RDMA write operation, the responder first allocates storage space for a QP (or a QP group) of the responder to access. A channel adapter on the responder associates a 32-bit M_Key key with a virtual address of the storage space. The responder sends the virtual address of the storage space, a length, and the M_Key key to the requester that can access a memory area. For example, the foregoing information may be sent to the requester by using the foregoing send operation.

The requester may initiate an RDMA write operation by sending an RDMA WRITE message, where the message includes data to be written to the responder, the virtual address of the storage space of the responder, a length of the data, and the M_Key key. The length of the data may range from 0 bytes to $2^{31}$ bytes. Similar to that of the send operation, if the length of the data is greater than the PMTU, the data is segmented into a plurality of packets based on the PMTU, and then the responder reassembles the packets to obtain the data. For a reliable connection, if data is a short message (that is, the data does not need to be segmented into a plurality of packets), the responder sends an acknowledge (ACK) message/a non-acknowledge (NAK) message to the requester for each packet; and if the data is a long message (that is, the data is segmented into a plurality of packets), the responder may send an acknowledge (ACK) message/a non-acknowledge (NAK) message to the requester for each packet, or send one acknowledge (ACK) message to the requester for a plurality of consecutive packets of same data; or send an acknowledge (ACK) message to the requester for a tail packet of the message. In addition, regardless of whether the data is a short message or a long message, the responder may send one acknowledge (ACK) message for a plurality of previously received packets. For example, an acknowledge (ACK) message of an RDMA WRITE message whose PSN is X may be used to confirm that a message whose PSN is smaller than X before the RDMA WRITE message is successfully received by the responder.

Figure 7A:
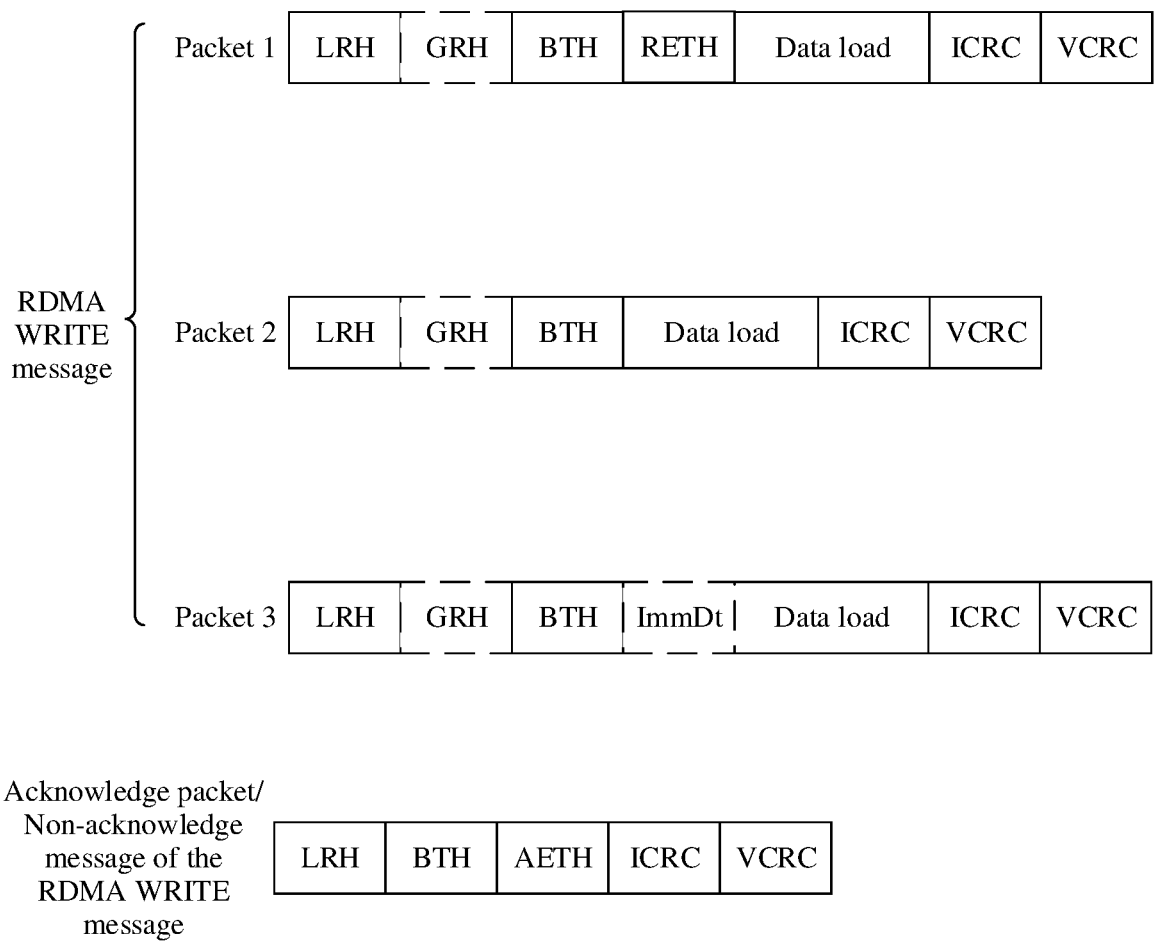
FIG. 7A is a schematic diagram of structures of an RDMA WRITE message based on the IB protocol and an acknowledge message/a non-acknowledge message of the RDMA WRITE message according to an embodiment of the present disclosure.
Figure 7B:
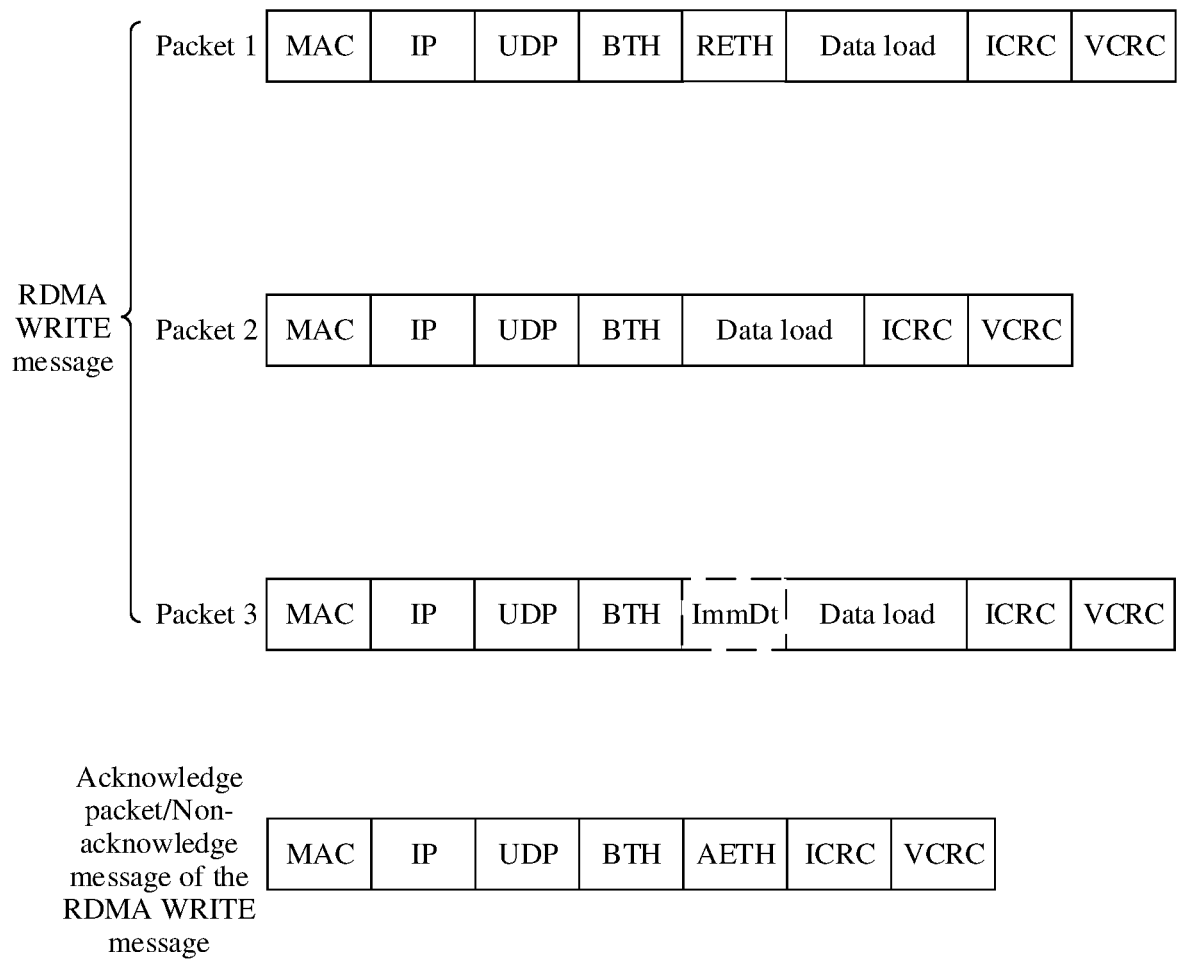
FIG. 7B is a schematic diagram of structures of an RDMA WRITE message based on the RoCEv2 protocol and an acknowledge message/a non-acknowledge message of the RDMA WRITE message according to an embodiment of the present disclosure.
Figure 8:
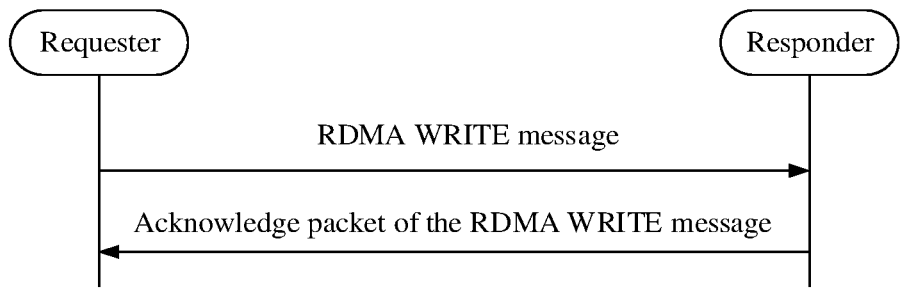
FIG. 8 is a schematic diagram of another process of interaction between a requester and a responder of a reliable connection according to an embodiment of the present disclosure.

For example, if the RDMA WRITE message is segmented into three packets, structures of the RDMA WRITE message based on the IB protocol and an acknowledge (ACK) message/a non-acknowledge (NAK) message of the RDMA WRITE message are shown in FIG. 7A, structures of the RDMA WRITE message based on the RoCEv2 protocol and an acknowledge (ACK) message/a non-acknowledge (NAK) message of the RDMA WRITE message are shown in FIG. 7B, and a process of interaction between a requester and a responder of a reliable connection is shown in FIG. 8.

An RDMA extended transport header (RETH) includes an additional transport field of an RDMA operation. For example, a virtual address of target storage space, a length of data of the RDMA operation, and an M_Key key are included. The responder determines, based on the M_Key key, that the requester has permission to access a corresponding virtual address, and stores the data indicated by the length in the storage space pointed to by the virtual address.

Similar to that of the send operation, an operation code field (OpCode field) in a BTH field determines the start and end of an RDMA WRITE message.

For the RDMA WRITE message, if a length of data is less than or equal to a PMTU, a BTH operation code "RDMA WRITE Only" or "RDMA WRITE Only with Immediate" is used, indicating that the message is not split (that is, the message is a single packet).

If the length of the data is zero, the BTH operation code "RDMA WRITE Only" or "RDMA WRITE Only with Immediate" is used, and a data load field does not exist in a packet. For an RDMA WRITE message whose BTH operation code is "RDMA WRITE Only", other fields are shown in a packet 1 in FIG. 7A or FIG. 7B. For an RDMA WRITE message whose BTH operation code is "RDMA WRITE Only with Immediate", an ImmDt field is added after an RETH field in a packet 1 in FIG. 7A or FIG. 7B, and other fields are shown in the packet 1.

If the length of the data is greater than the PMTU, a BTH operation code of a first packet is "RDMA WRITE first", indicating that the packet is a first packet; a BTH operation code of a middle packet is "RDMA WRITE Middle", indicating that the packet is a middle packet; and a BTH operation code of a last packet is "RDMA WRITE Last" or "RDMA WRITE Last with Immediate", indicating that the packet is a tail packet.

For an acknowledge (ACK) message or a non-acknowledge (NAK) message of the RDMA WRITE message, a BTH operation code is "Acknowledge".

RDMA Read Operation

The RDMA read operation is a reverse operation of the RDMA write operation, and is used by the requester to read data in storage space of the responder.

Before the requester is allowed to perform the RDMA read operation, the responder first allows the requester to access a virtual address of the responder. To be specific, a virtual address and a length of data to be read by using the RDMA read operation, and an M_Key key are sent to the requester. For example, the foregoing information may be sent to the requester by using the foregoing send operation.

The requester may initiate the RDMA read operation by sending an RDMA READ request message, where the message includes the virtual address of the storage space of the responder, a length of data of the RDMA operation, and the M_Key key. The responder sends an RDMA READ response message to the requester, where the message includes read data. A length of the to-be-read data may range from 0 bytes to $2^{31}$ bytes. If the length is greater than a PMTU, the to-be-read data is segmented into a plurality of packets based on the PMTU, so that the plurality of packets of the RDMA READ response message are transmitted. The responder reassembles the packets to obtain the data. For a reliable connection, the RDMA READ response message does not have a corresponding acknowledge (ACK) message. If the requester finds that a packet loss occurs in the RDMA READ response message, the requester re-initiates an RDMA read operation.

Figure 9A:
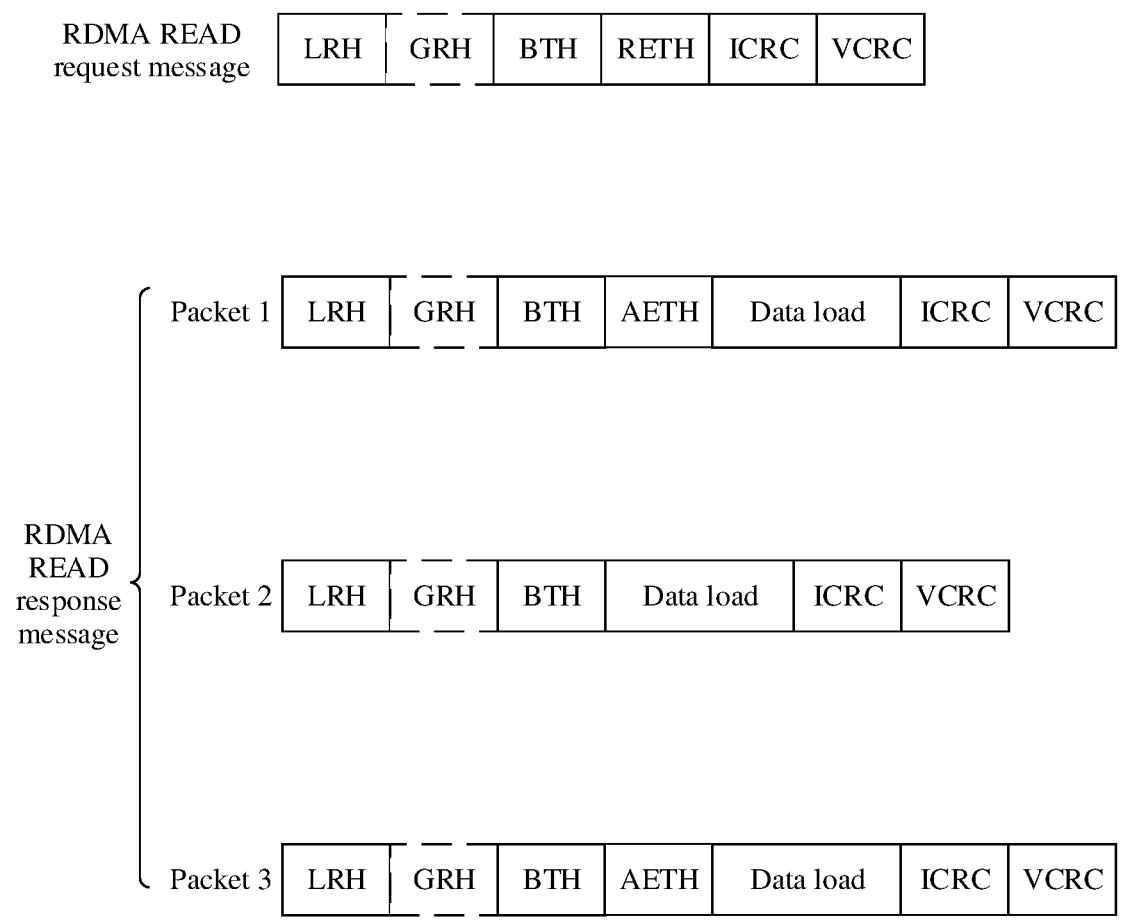
FIG. 9A is a schematic diagram of structures of an RDMA READ request message based on the IB protocol and an RDMA READ response message according to an embodiment of the present disclosure.
Figure 9B:
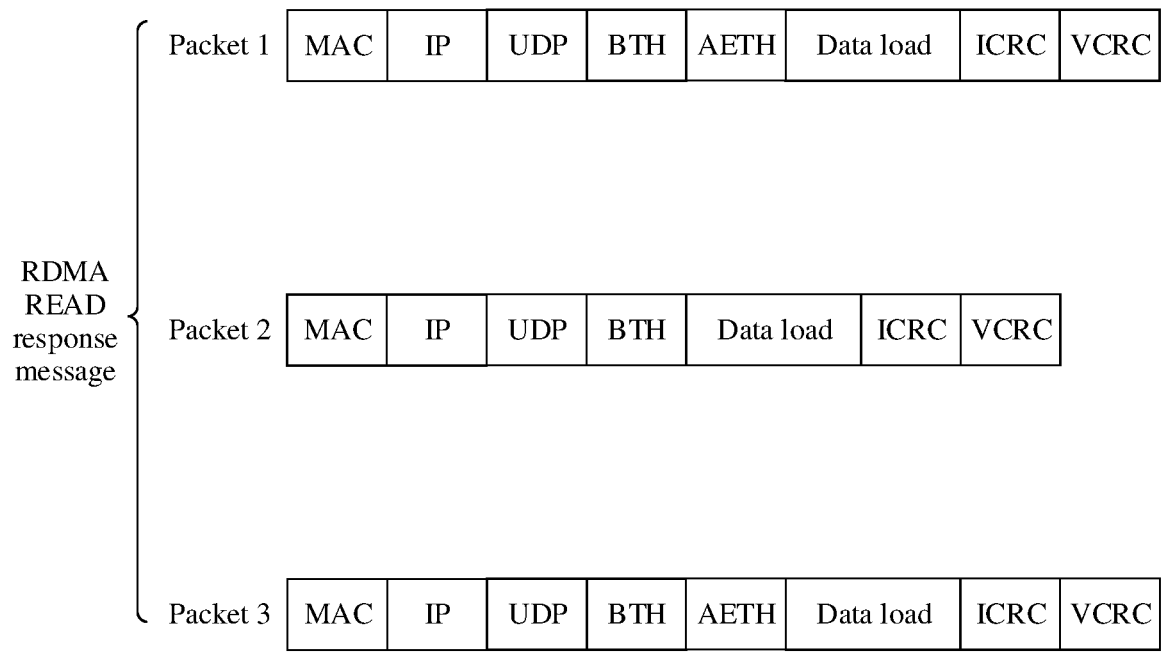
FIG. 9B is a schematic diagram of structures of an RDMA READ request message based on the RoCEv2 protocol and an RDMA READ response message according to an embodiment of the present disclosure.
Figure 10:
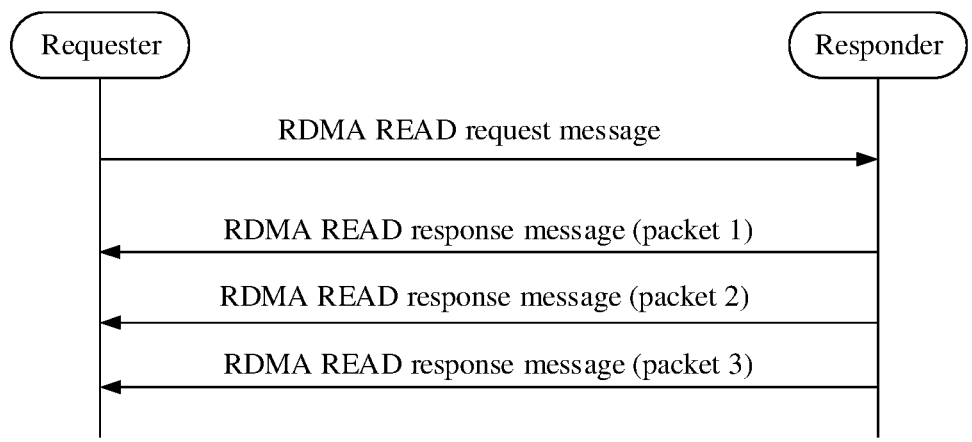
FIG. 10 is a schematic diagram of still another process of interaction between a requester and a responder of a reliable connection according to an embodiment of the present disclosure.

For example, if the RDMA READ response message is segmented into three packets, structures of an RDMA READ request message based on the IB protocol and the RDMA READ response message are shown in FIG. 9A, structures of an RDMA READ request message based on the RoCEv2 protocol and the RDMA READ response message are shown in FIG. 9B, and a process of interaction between a requester and a responder of a reliable connection is shown in FIG. 10.

An operation code field (OpCode field) in a BTH field determines the start and end of a message (the RDMA READ request message or the RDMA READ response message).

For the RDMA READ request message, a BTH operation code is "RDMA READ Request".

For the RDMA READ response message, if a length of data is less than or equal to a PMTU, a BTH operation code "RDMA READ Response Only" is used, indicating that the message cannot be split (that is, the message is a single packet).

If the length of the data is zero, a BTH operation code "RDMA READ Response Only" is used, and a data load field does not exist in the RDMA read response message, but all other fields are shown in a packet 1 in FIG. 9A or FIG. 9B.

If the length of the data is greater than the PMTU, a BTH operation code of a first packet is "RDMA READ Response first", indicating that the packet is a first packet; a BTH operation code of a middle packet is "RDMA READ Response Middle", indicating that the packet is a middle packet; and a BTH operation code of a last packet is "RDMA READ Response Last", indicating that the packet is a tail packet.

Figure 11:
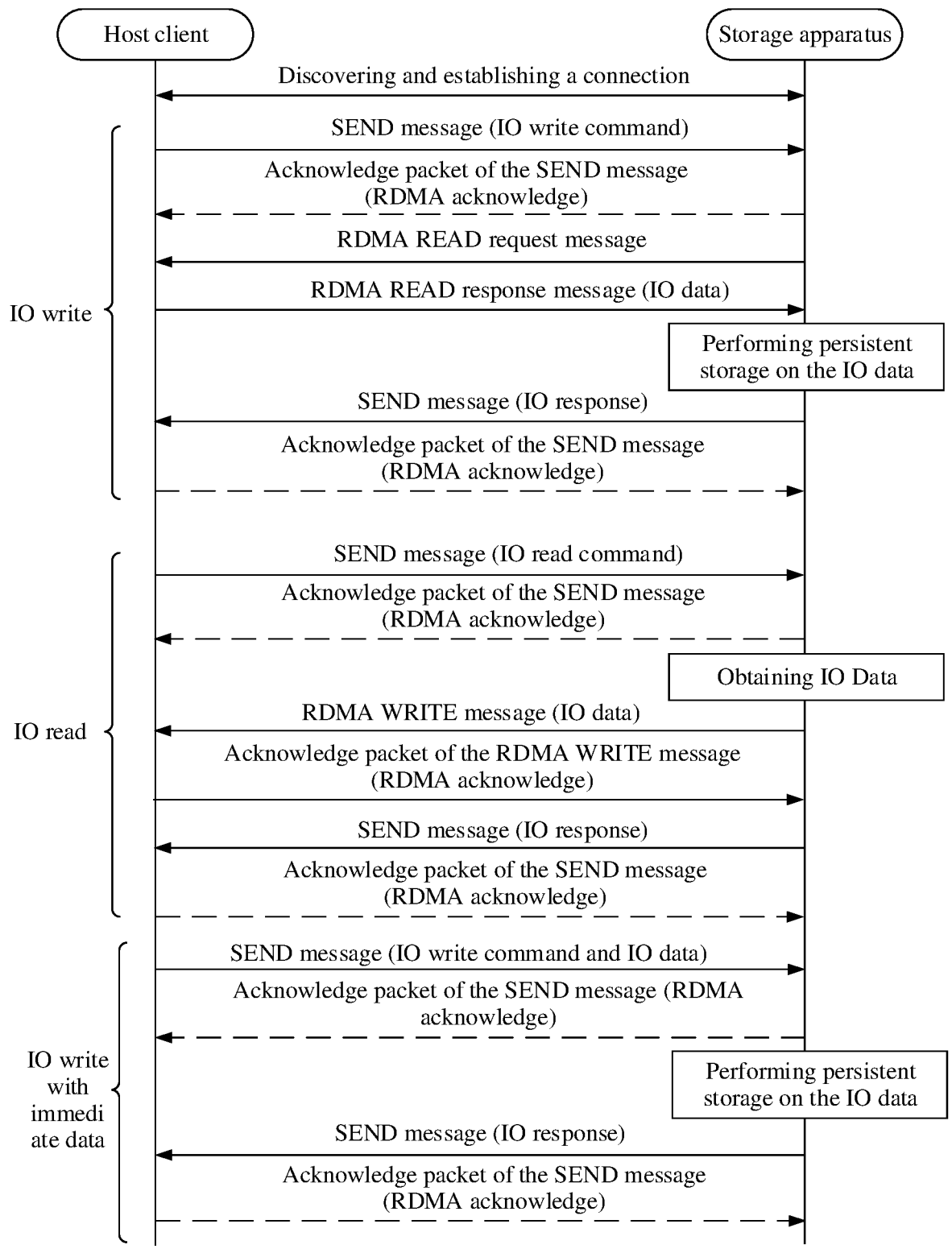
FIG. 11 is a schematic diagram of a process in which a host client and a storage apparatus complete IO read and write by using an RDMA operation according to an embodiment of the present disclosure.

FIG. 11 shows a process in which a host client and a storage apparatus complete IO read and write by using the foregoing RDMA operation.

The host client first discovers the storage apparatus in a network and establishes a connection to the storage apparatus.

In a process in which the host client initiates an IO write operation to the storage apparatus, the host client sends a SEND message to the storage apparatus. A data load of a packet is an IO write command. For a reliable connection, the storage apparatus may send an acknowledge (ACK) message of the SEND message to the host client, indicating that the IO write command is received. Then, the storage apparatus (as a requester) sends an RDMA READ request message to the host client (as a responder), and the host client sends an RDMA READ response message to the storage apparatus. A data load of a packet is IO data. After performing persistent storage on the IO data, that is, after storing the IO data in a non-volatile storage medium like an SSD, the storage apparatus sends a SEND message to the host client. A packet includes an IO response, indicating that the IO write operation is completed. The host client sends an acknowledge (ACK) message of the SEND message to the storage apparatus, indicating that the IO response is received.

In a process in which the host client initiates an IO read operation to the storage apparatus, the host client sends a SEND message to the storage apparatus. A data load of a packet is an IO read command. For a reliable connection, the storage apparatus may send an acknowledge (ACK) message of the SEND message to the host client, indicating that the IO read command is received. After obtaining IO data, that is, after obtaining the IO data from a non-volatile storage medium like an SSD, the storage apparatus (as a requester) sends an RDMA WRITE message to the host client (as a responder). A data load of the message is the IO data. The host client sends an acknowledge (ACK) message of the RDMA WRITE message to the storage apparatus. The storage apparatus sends a SEND message to the host client. The message includes an IO response, indicating that the IO read operation is completed. The host client may send an acknowledge (ACK) message of the SEND message to the storage apparatus, indicating that the IO response is received.

In a process in which the host client initiates an IO write operation with immediate data to the storage apparatus, the host client sends a SEND message to the storage apparatus. A packet carries an IO read command and IO data. For a reliable connection, the storage apparatus may send an acknowledge (ACK) message of the SEND message to the host client, indicating that the IO read command and the IO data are received. After performing persistent storage on the IO data, that is, after storing the IO data in a non-volatile storage medium like an SSD, the storage apparatus sends a SEND message to the host client. A packet includes an IO response, indicating that the IO write operation is completed. The host client may send an acknowledge (ACK) message of the SEND message to the storage apparatus, indicating that the IO response is received.

It can be learned from the foregoing that, a complete IO write operation transfers a command message (for example, a command request and a command response) by using a SEND operation, and transfers a data message by using an RDMA READ operation; a complete IO read operation transfers a command message by using a SEND operation, and transfers a data message by using an RDMA WRITE operation; and a complete IO write operation with immediate data transfers a command message and IO data by using a SEND operation.

Figure 12:
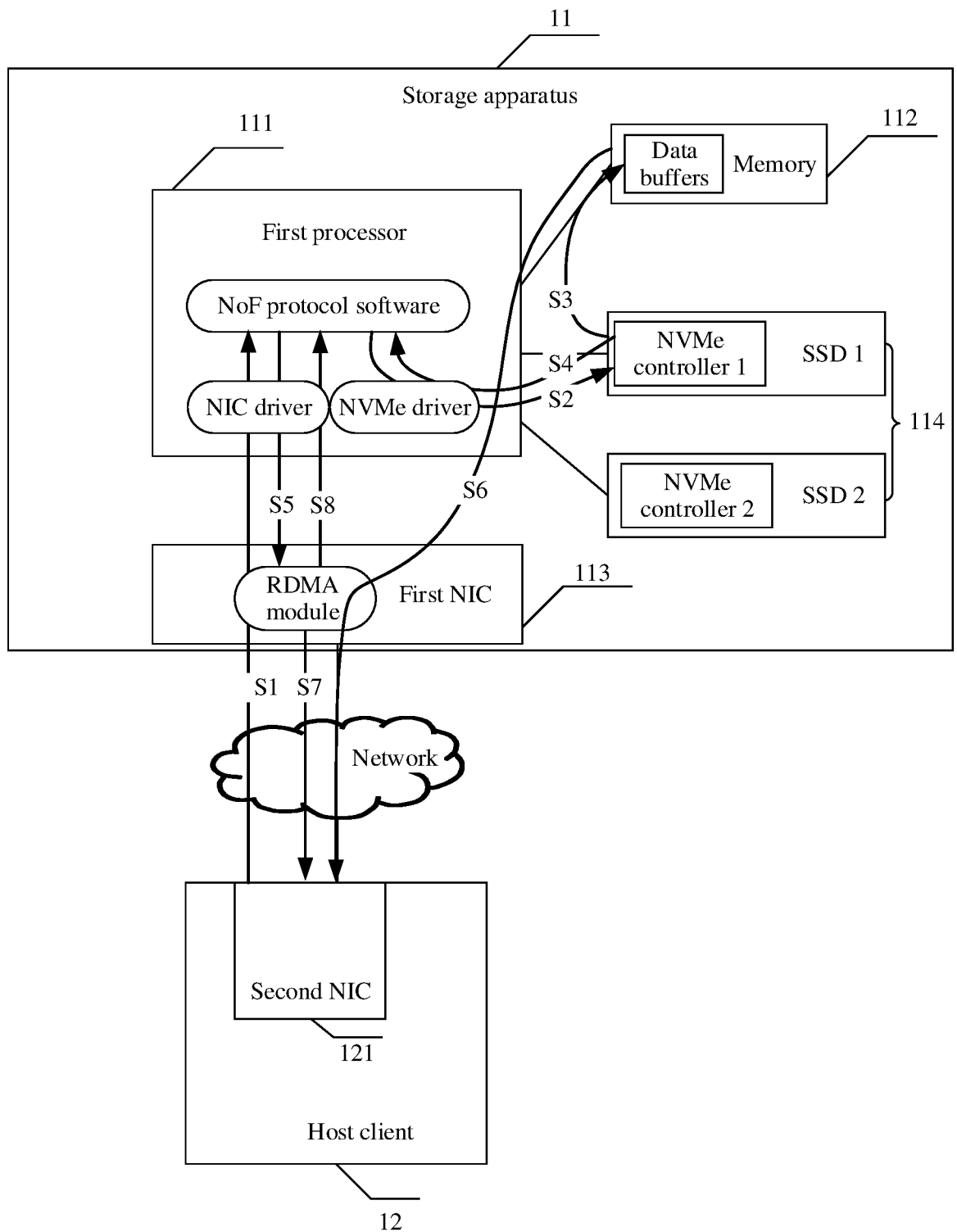
FIG. 12 is a schematic flowchart 1 of processing an IO read command by NoF protocol software according to an embodiment of the present disclosure.
Figure 13:
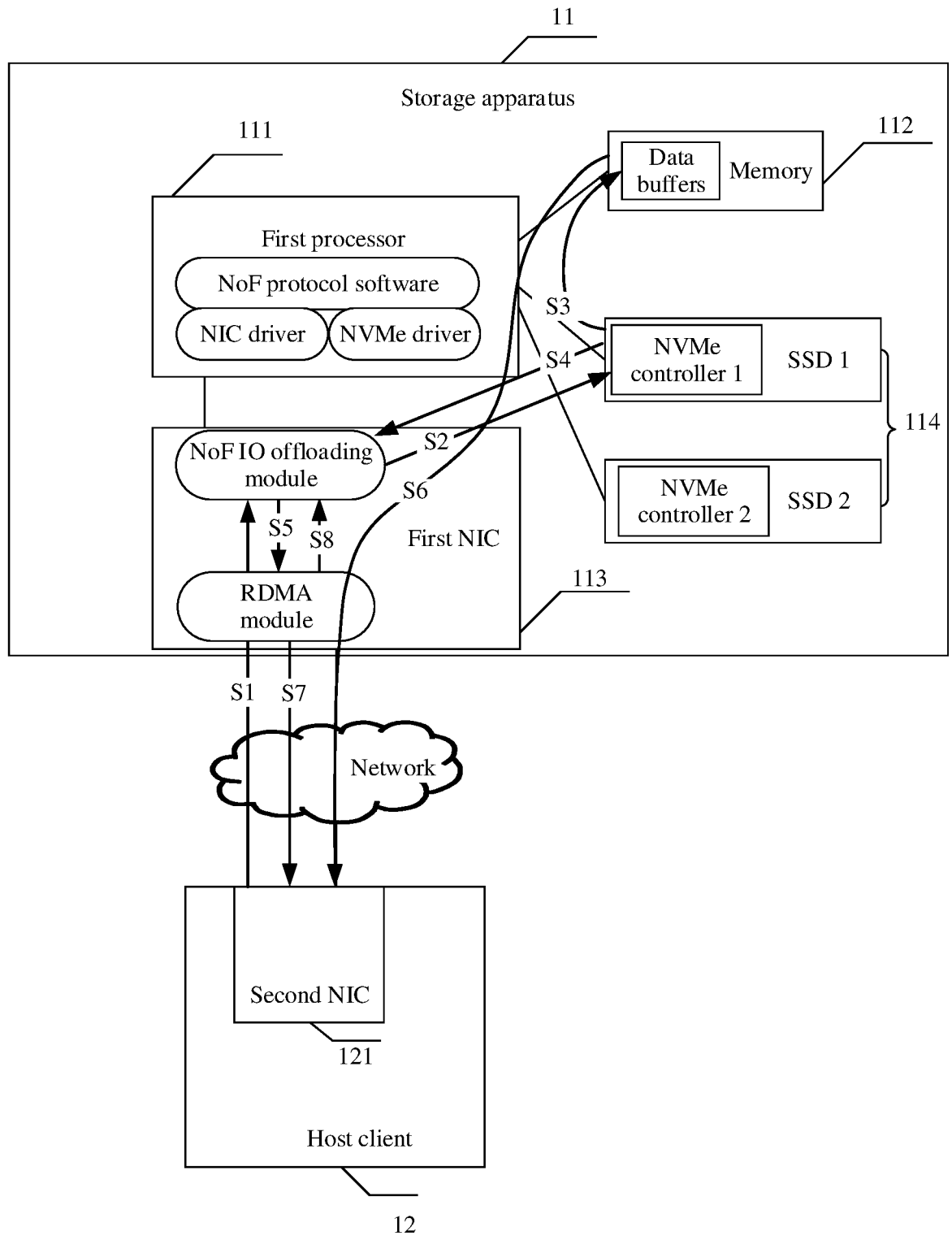
FIG. 13 is a schematic flowchart 1 of processing an IO read command by a first NIC according to an embodiment of the present disclosure.
Figure 14:
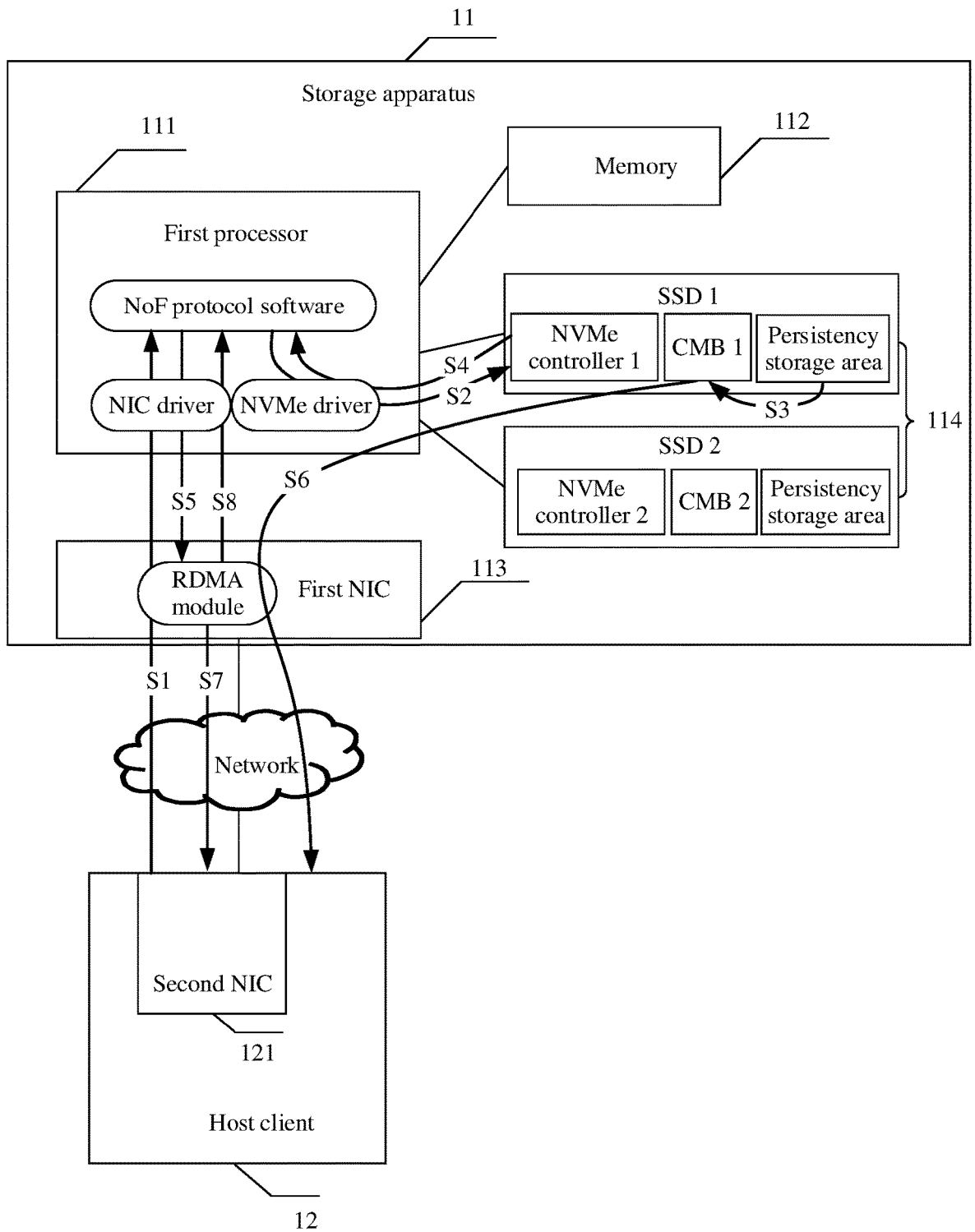
FIG. 14 is a schematic flowchart 2 of processing an IO read command by NoF protocol software according to an embodiment of the present disclosure.
Figure 15:
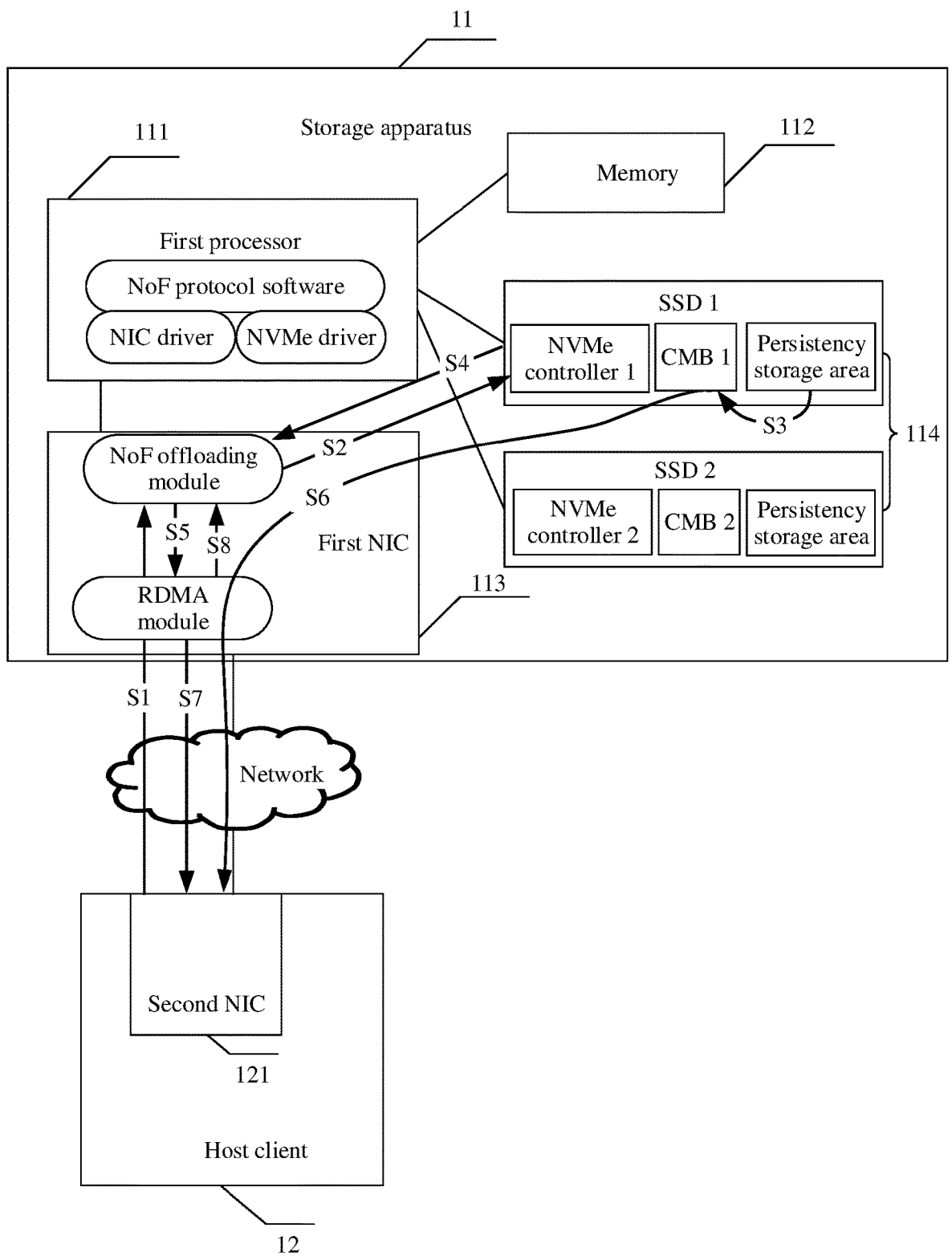
FIG. 15 is a schematic flowchart 2 of processing an IO read command by a first NIC according to an embodiment of the present disclosure.

With reference to FIG. 12 to FIG. 15, the following describes how to complete an IO read operation between a storage apparatus and a host client by using a scenario in which a plurality of non-volatile storage media can be accessed through one QP connection in FIG. 3C as an example. In FIG. 12 and FIG. 13, IO data is first copied from an SSD to a memory, and then sent from the memory to the host client. In FIG. 14 and FIG. 15, IO data is first copied from a storage area of an SSD to a controller memory buffer (CMB) of the SSD, and then sent from the CMB to the host client. In addition, in FIG. 12 and FIG. 14, NoF protocol software running in a first processor 111 processes an IO read command. In FIG. 13 and FIG. 15, an NoF IO offloading module (software or hardware) in a first NIC 113 processes an IO read command.

As shown in FIG. 12, a process in which NoF protocol software running in a first processor 111 processes an IO read command is as follows:

S1: An RDMA module (software or hardware) in a first NIC 113 of a storage apparatus 11 receives a SEND message (carrying an IO read command) from a second NIC 121 of a host client 12, and sends the SEND message to NoF protocol software in a first processor 111 through an NIC driver.

S2: The NoF protocol software parses the IO read command, determines that an NVMe device to be accessed is an SSD 1, allocates data buffers in a memory 112, and posts the IO read command to an NVMe controller 1 of the SSD 1.

S3: The NVMe controller 1 executes the IO read command to copy IO data from the SSD 1 to the data buffers in the memory 112.

S4: The NVMe controller 1 reports an IO completion event to the NoF protocol software, or the NoF protocol software polls an IO completion event of each SSD.

S5: The NoF protocol software processes the IO completion event, and posts an RDMA WRITE operation and a SEND operation to the RDMA module in the first NIC 113.

S6: The RDMA module in the first NIC 113 performs the RDMA WRITE operation, obtains the IO data from the data buffers in the memory 112, and sends the IO data to the second NIC 121 by using an RDMA WRITE message.

S7: The RDMA module in the first NIC 113 performs the SEND operation, and sends a SEND message (carrying an IO response) to the second NIC 121.

S8: The RDMA module in the first NIC 113 reports a send completion event to the NoF protocol software, and the NoF protocol software releases a related resource.

As shown in FIG. 13, a process in which an NoF IO offloading module in a first NIC 113 processes an IO read command is as follows:

S1: An RDMA module in a first NIC 113 of a storage apparatus 11 receives a SEND message (carrying an IO read command) from a second NIC 121 of a host client 12, and sends the SEND message to an NoF IO offloading module in the first NIC 113.

S2: The NoF IO offloading module parses the IO read command, determines that an NVMe device to be accessed is an SSD 1, allocates data buffers in a memory 112, and posts the IO read command to an NVMe controller 1 of the SSD 1.

S3: The NVMe controller 1 executes the IO read command to copy IO data from the SSD 1 to the data buffers in the memory 112.

S4: The NVMe controller 1 reports an IO completion event to the NoF IO offloading module, or the NoF IO offloading module polls an IO completion event of each SSD.

S5: The NoF IO offloading module processes the IO completion event, and posts an RDMA WRITE operation and a SEND operation to the RDMA module in the first NIC 113.

S6: The RDMA module in the first NIC 113 performs the RDMA WRITE operation, obtains the IO data from the data buffers in the memory 112, and sends the IO data to the second NIC 121 by using an RDMA WRITE message.

S7: The RDMA module in the first NIC 113 performs the SEND operation, and sends a SEND message (carrying an IO response) to the second NIC 121.

S8: The RDMA module in the first NIC 113 reports a send completion event to the NoF IO offloading module, and the NoF IO offloading module releases a related resource.

It can be learned from FIG. 12 and FIG. 13 that, in a process of an IO read operation, the IO data is first stored in a memory and then removed from the memory. As a result, memory bandwidth pressure is high, and becomes a bottleneck of IO performance of the storage apparatus 11.

As shown in FIG. 14, a process in which NoF protocol software running in a first processor 111 processes an IO read command is as follows:

S1: An RDMA module in a first NIC 113 of a storage apparatus 11 receives a SEND message (carrying an IO read command) from a second NIC 121 of a host client 12, and sends the SEND message to NoF protocol software in a first processor 111 through an NIC driver.

S2: The NoF protocol software parses the IO read command, determines that an NVMe device to be accessed is an SSD 1, allocates data buffers in a CMB 1 of the SSD 1, and posts the IO read command to an NVMe controller 1 of the SSD 1.

S3: The NVMe controller 1 executes the IO read command to copy IO data from a persistency storage area of the SSD 1 to the data buffers in the CMB 1.

S4: The NVMe controller 1 reports an IO completion event to the NoF protocol software, or the NoF protocol software polls an IO completion event of each SSD.

S5: The NoF protocol software processes the IO completion event, and posts an RDMA WRITE operation and a SEND operation to the RDMA module in the first NIC 113.

S6: The RDMA module in the first NIC 113 performs the RDMA WRITE operation, obtains the IO data from the data buffers in the CMB 1, and sends the IO data to the second NIC 121 by using an RDMA WRITE message.

S7: The RDMA module in the first NIC 113 performs the SEND operation, and sends a SEND message (carrying an IO response) to the second NIC 121.

S8: The RDMA module in the first NIC 113 reports a send completion event to the NoF protocol software, and the NoF protocol software releases a related resource.

As shown in FIG. 15, a process in which an NoF IO offloading module in a first NIC 113 processes an IO read command is as follows:

S1: An RDMA module in a first NIC 113 of a storage apparatus 11 receives a SEND message (carrying an IO read command) from a second NIC 121 of a host client 12, and sends the SEND message to an NoF IO offloading module in the first NIC 113.

S2: The NoF IO offloading module parses the IO read command, determines that an NVMe device to be accessed is an SSD 1, allocates data buffers in a CMB 1 of the SSD 1, and posts the IO read command to an NVMe controller 1 of the SSD 1.

S3: The NVMe controller 1 executes the IO read command to copy IO data from a persistency storage area of the SSD 1 to the data buffers in the CMB 1.

S4: The NVMe controller 1 reports an IO completion event to the NoF IO offloading module, or the NoF IO offloading module polls an IO completion event of each SSD.

S5: The NoF IO offloading module processes the IO completion event, and posts an RDMA WRITE operation and a SEND operation to the RDMA module in the first NIC 113.

S6: The RDMA module in the first NIC 113 performs the RDMA WRITE operation, obtains the IO data from the data buffers in the CMB 1, and sends the IO data to the second NIC 121 by using an RDMA WRITE message.

S7: The RDMA module in the first NIC 113 performs the SEND operation, and sends a SEND message (carrying an IO response) to the second NIC 121.

S8: The RDMA module in the first NIC 113 reports a send completion event to the NoF IO offloading module, and the NoF IO offloading module releases a related resource.

Figure 16:
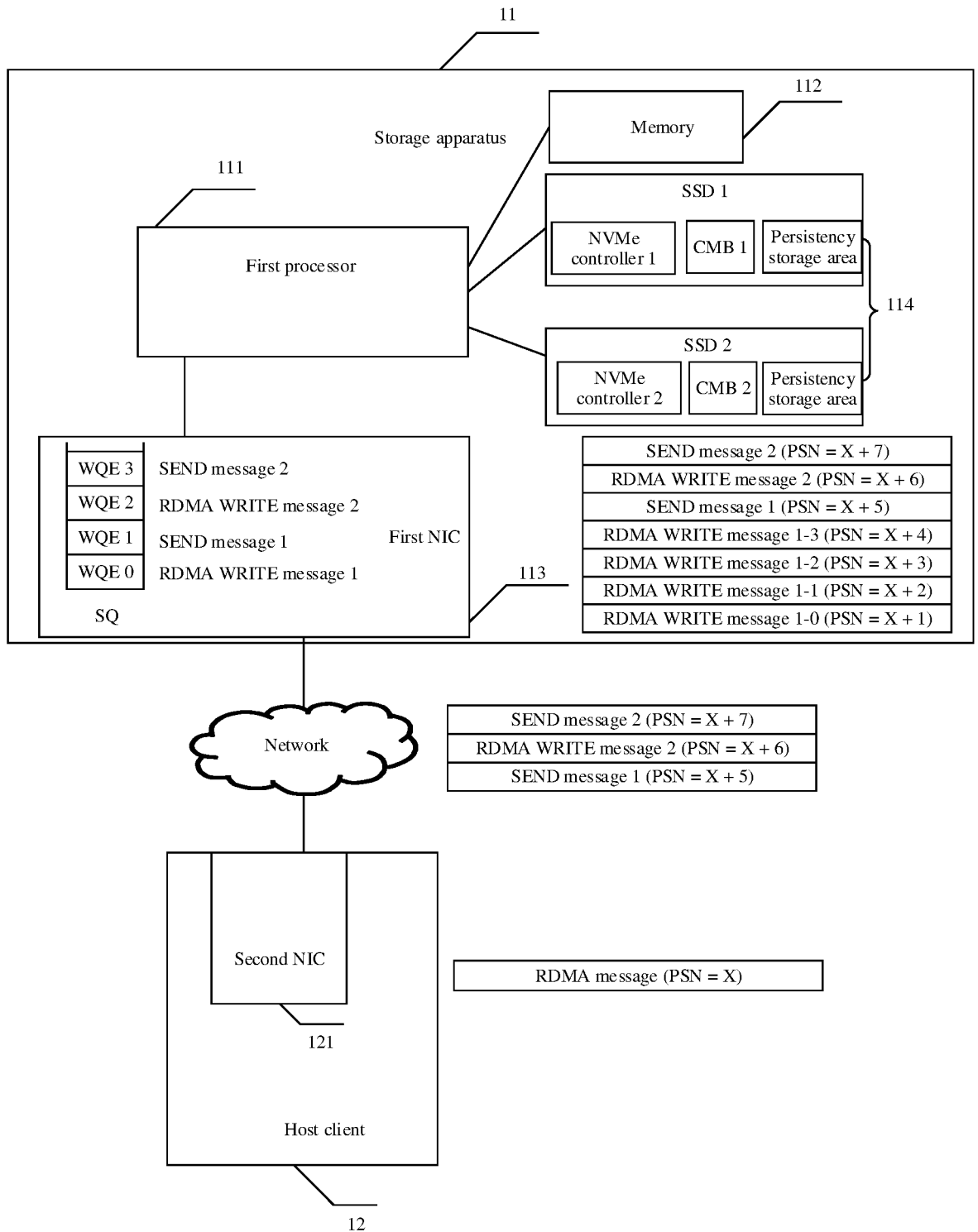
FIG. 16 is a schematic diagram 1 of disconnection of a QP connection because a non-volatile storage medium is faulty according to an embodiment of the present disclosure.
Figure 17:
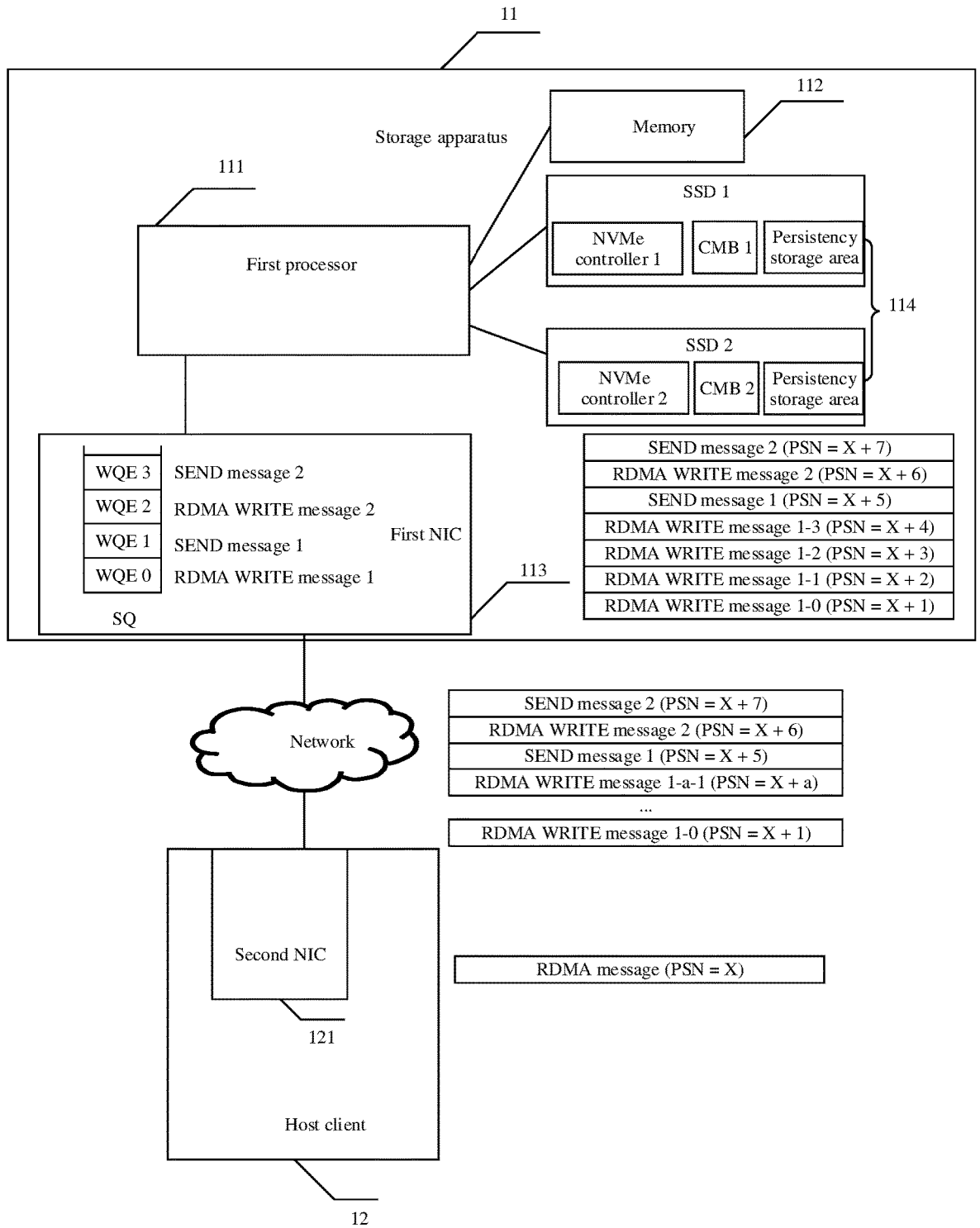
FIG. 17 is a schematic diagram 2 of disconnection of a QP connection because a non-volatile storage medium is faulty according to an embodiment of the present disclosure.

For the manners in FIG. 14 and FIG. 15, when an SSD is faulty, a CMB in the SSD cannot be accessed by the first NIC 113, and an RDMA message sent by the first NIC 113 to the host client 12 is lost (a part of RDMA packets is lost). The host client 12 indicates the first NIC 113 to retransmit the lost RDMA packets. When a quantity of retransmission times exceeds a threshold, a QP connection between the host client 12 and the storage apparatus 11 is disconnected, and the host client 12 cannot access another non-volatile storage medium that works normally in the storage apparatus 11. For example, as shown in FIG. 16 and FIG. 17, it is assumed that an RDMA packet (whose PSN is X) sent by the first NIC 113 of the storage apparatus 11 is received by the second network interface card 121 of the host client 12. In this case, the first processor 111 of the storage apparatus 11 processes two IO read commands (a first IO read command instructs to read an SSD 1 and a length of read data is 4 KB, and a second IO read command instructs to read an SSD 2 and a length of read data is 1 KB). The first processor 111 posts four WQEs (a WQE 0 and a WQE 1 are triggered by the first IO read command, that is, correspond to the SSD 1; and a WQE 2 and a WQE 3 are triggered by the second IO read command, that is, correspond to the SSD 2) to an SQ of the first NIC 113, and notifies the first NIC 113 to send RDMA messages indicated by the WQEs, where the WQE 0 indicates to send an RDMA WRITE message 1, and a length is 4 KB; the WQE 1 indicates to send a SEND message 1, and a length is 16 B; the WQE 2 indicates to send an RDMA WRITE message 2, and a length is 1 KB; and the WQE 3 indicates to send a SEND message 2, and a length is 16 B. The first NIC 113 generates seven packets (PSNs are X+1 to X+7) based on the WQEs in the SQ. The RDMA WRITE message 1 is split into four RDMA packets (an RDMA WRITE message 1-0 to an RDMA WRITE message 1-3, and PSNs are X+1 to X+4), and other messages are not split, that is, each of the other messages occupies one RDMA packet.

In a scenario 1 shown in FIG. 16, before the first NIC 113 sends an RDMA message (for example, the RDMA WRITE message 1), the SSD 1 is faulty, so that a CMB of the SSD 1 cannot be accessed. Because the CMB of the SSD 1 cannot be accessed, the four RDMA packets of the RDMA WRITE message 1 are discarded by the first NIC 113, and the first NIC 113 sends remaining three RDMA packets (PSNs are X+5 to X+7) to the second network interface card 121. The second network interface card 121 detects a packet loss, and sends a non-acknowledge (NAK) message to notify the first NIC 113 to perform retransmission. However, because the CMB of the SSD 1 cannot be accessed, the first NIC 113 fails to perform retransmission. After detecting that a quantity of retransmission times exceeds a threshold, the second NIC 121 disconnects a QP connection to the first NIC 113.

In a scenario 2 shown in FIG. 17, when the first NIC 113 sends an RDMA message (for example, the RDMA WRITE message 1), the SSD 1 is faulty, so that a CMB of the SSD 1 cannot be accessed. It is assumed that the first NIC 113 has sent a (a≥1 and a<4) RDMA packets (PSNs are X+1 to X+a) of the RDMA WRITE message 1, then the SSD 1 is faulty, and the CMB of the SSD 1 cannot be accessed. In this case, remaining (4-*a*) RDMA packets (PSNs are X+a+1 to X+4) of the RDMA WRITE message 1 are discarded by the first NIC 113, and the first NIC 113 sends remaining three RDMA packets (PSNs are X+5 to X+7) to the second network interface card 121. The second network interface card 121 detects a packet loss, and sends a non-acknowledge (NAK) message to notify the first NIC 113 to perform retransmission. However, because the CMB of the SSD 1 cannot be accessed, the first NIC 113 fails to perform retransmission. After detecting that a quantity of retransmission times exceeds a threshold, the second NIC 121 disconnects a QP connection to the first NIC 113.

Therefore, according to the network interface card, the message sending method, and the storage apparatus that are provided in embodiments of the present disclosure, in a scenario in which the host client initiates an IO read operation to the storage apparatus, before the network interface card of the storage apparatus sends an RDMA message, it is first determined whether a non-volatile storage medium corresponding to the RDMA message is faulty. The RDMA message is normally sent only when no fault occurs. When a fault occurs, the RDMA message is not sent, but an RDMA message corresponding to a non-volatile storage medium that is not faulty is sent, so that when a non-volatile storage medium is faulty, the network interface card of the host client does not frequently indicate the network interface card of the storage apparatus to perform retransmission because the network interface card of the host client always detects a packet loss in the RDMA message. Further, a QP connection between the host client and the storage apparatus is not disconnected because a quantity of retransmission times exceeds a threshold.

Figure 18:
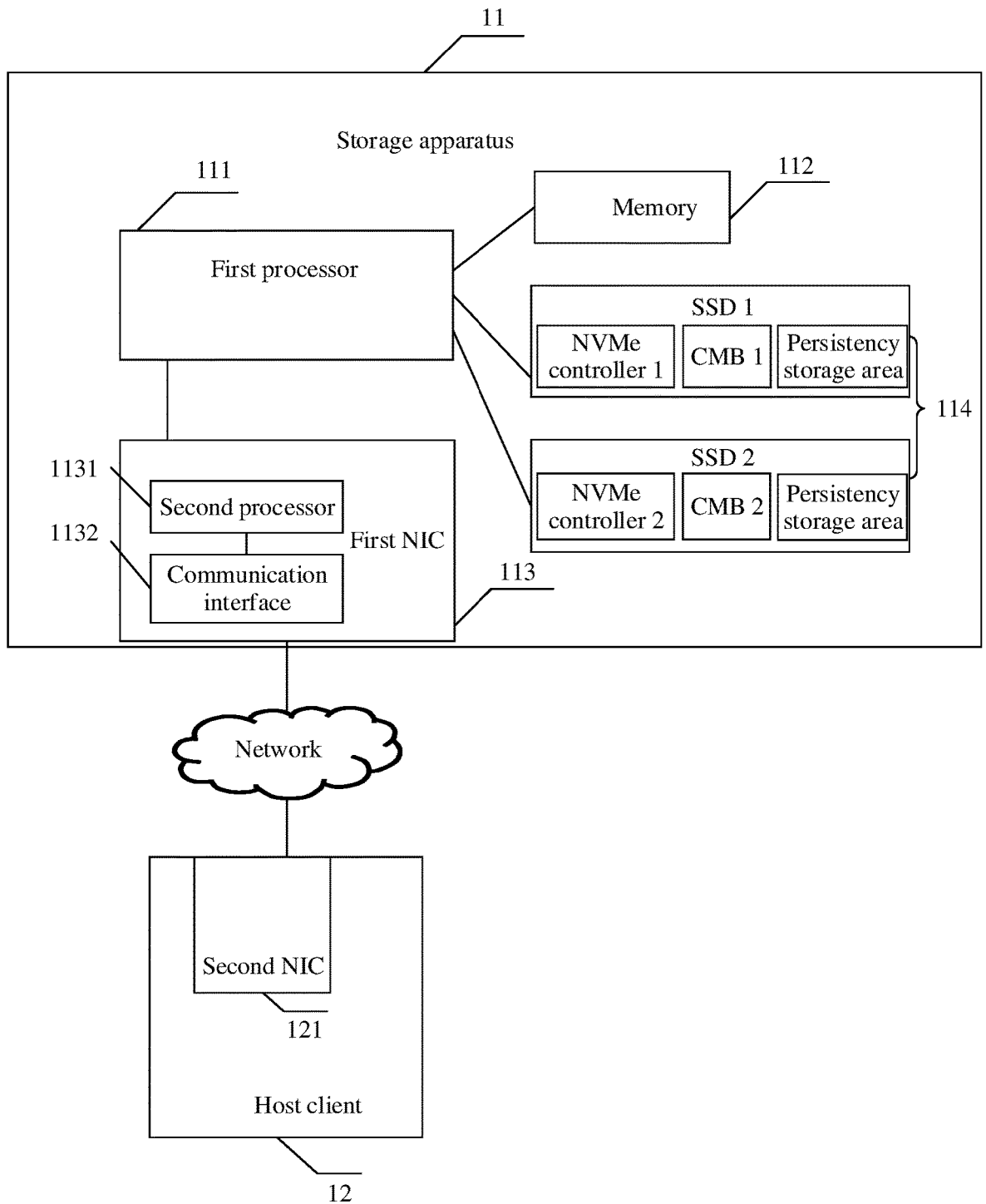
FIG. 18 is a schematic diagram of another architecture of a storage system according to an embodiment of the present disclosure.

As shown in FIG. 18, a first NIC 113 of a storage apparatus 11 includes a second processor 1131 and a communication interface 1132. The second processor 1131 is configured to perform logic processing and data management, and the communication interface 1132 is configured to communicate with a second NIC 121 of a host client 12. The storage apparatus 11 is configured to perform a message sending method shown in FIG. 19.

S1901: A first processor 111 generates first indication information and second indication information in response to an IO read command from the host client 12.

Correspondingly, the second processor 1131 of the first NIC 113 obtains the first indication information and the second indication information from the first processor 111. It should be noted that the first indication information or the second indication information may also be generated by the second processor 1131 of the first NIC 113.

The IO read command from the host client 12 instructs the storage apparatus to send an RDMA WRITE message and a SEND message corresponding to the RDMA WRITE message, where the RDMA message carries IO data, and the SEND message carries an IO response corresponding to the IO data, so that the host client 12 reads the IO data from the storage apparatus 11.

The first indication information indicates an identifier (for example, a disk number) of a non-volatile storage medium corresponding to a to-be-sent RDMA message (the RDMA WRITE message or the SEND message corresponding to the RDMA WRITE message), and the identifier may be a monotonically increasing sequence number, or may be another number specified manually. Therefore, the to-be-sent RDMA message corresponds to the first indication information. A parameter definition of a Verbs interface in the RDMA protocol may be extended. The first indication information may be in a WQE that corresponds to the to-be-sent RDMA message and that is posted by the first processor 111 or the second processor 1131 to the SQ of the first NIC 113, or the first indication information may be transferred in another manner. This is not limited in embodiments of the present disclosure. The non-volatile storage medium may include an SSD and the like.

In a scenario in which the host client initiates an IO read operation to the storage apparatus, the to-be-sent RDMA message may include an RDMA WRITE message (carrying IO data) (being split or not being split) or a SEND message (carrying an IO response) corresponding to the RDMA WRITE message. As shown in the IO read operation in FIG. 11, after sending the RDMA WRITE message, the storage apparatus sends the SEND message corresponding to the RDMA WRITE message, to indicate whether the IO read operation performed for the IO data in the RDMA WRITE message is completed. Therefore, the SEND message corresponding to the RDMA WRITE message corresponds to the IO data carried in the RDMA WRITE message.

Therefore, a non-volatile storage medium corresponding to the to-be-sent RDMA message includes the following manners. If the to-be-sent RDMA message is an RDMA WRITE message, the non-volatile storage medium corresponding to the to-be-sent RDMA message is a non-volatile storage medium that stores IO data carried in the RDMA WRITE message. If the to-be-sent RDMA message is a packet of a SEND message corresponding to the RDMA WRITE message, the non-volatile storage medium corresponding to the to-be-sent RDMA message is a non-volatile storage medium that stores IO data corresponding to the SEND message.

In addition, the RDMA WRITE message and the SEND message corresponding to the RDMA WRITE message correspond to the same first indication information. For example, if IO data is stored in an SSD 1, first indication information in a WQE that is in an SQ and that corresponds to the RDMA WRITE message carrying the IO data indicates an identifier of the SSD 1, and first indication information in a WQE that is in the SQ and that corresponds to the SEND message corresponding to the RDMA WRITE message also indicates the identifier of the SSD 1.

The second indication information indicates whether a non-volatile storage medium corresponding to the identifier is faulty, that is, the identifier of the non-volatile storage medium may be used as an index to indicate whether the corresponding non-volatile storage medium is faulty. For example, when the second indication information is 1, it indicates that the non-volatile storage medium corresponding to the identifier is faulty; and when the second indication information is 0, it indicates that the non-volatile storage medium corresponding to the identifier is not faulty. Alternatively, when the second indication information is 0, it indicates that the non-volatile storage medium corresponding to the identifier is faulty; and when the second indication information is 1, it indicates that the non-volatile storage medium corresponding to the identifier is not faulty. The second indication information may be stored in a register of the first NIC 113 or stored in the memory 112. This is not limited in embodiments of the present disclosure.

NoF protocol software running in the first processor 111 may monitor whether a non-volatile storage medium is faulty. When a non-volatile storage medium is faulty, second indication information corresponding to the non-volatile storage medium is set to be faulty. When a non-volatile storage medium recovers from a fault (or is not faulty), second indication information corresponding to the non-volatile storage medium is set to be not faulty. Alternatively, it is assumed that second indication information corresponding to a non-volatile storage medium is not faulty by default. When the non-volatile storage medium is faulty, an interrupt may be triggered. When processing the interrupt, the first processor 111 sets the second indication information corresponding to the non-volatile storage medium to be faulty.

The first indication information and the second indication information may jointly indicate whether a non-volatile storage medium corresponding to a to-be-sent RDMA message is faulty. A reason for implementing the function by using two pieces of indication information instead of one piece of indication information is as follows: A fault of a non-volatile storage medium may occur at any time, and is asynchronous with sending of an RDMA message by the first NIC 113. When the first processor 111 posts a WQE to an SQ, the non-volatile storage medium may not be faulty. When the first NIC 113 sends the RDMA message, the non-volatile storage medium may be faulty. Therefore, whether a corresponding non-volatile storage medium is faulty cannot be directly configured for each RDMA message, but an identifier of a non-volatile storage medium corresponding to each RDMA packet is configured by using the first indication information, then, whether the non-volatile storage medium corresponding to the identifier is faulty is separately configured by using the second indication information. In this way, whether a non-volatile storage medium corresponding to a to-be-sent RDMA message is faulty may be determined with reference to the two pieces of indication information.

In addition, a parameter definition of a Verbs interface in the RDMA protocol may be extended, and a WQE that is in an SQ and that corresponds to a to-be-sent RDMA message may further include fifth indication information, so that the second processor 1131 obtains the fifth indication information, or the fifth indication information may be transferred in another manner. This is not limited in embodiments of the present disclosure. The fifth indication information indicates that the to-be-sent RDMA message is stored in a memory or a non-volatile storage medium (for example, a CMB of an SSD). For example, when the fifth indication information is 1, it indicates that the to-be-sent RDMA message is stored in the memory; and when the fifth indication information is 0, it indicates that the to-be-sent RDMA message is stored in the non-volatile storage medium (CMB). Alternatively, when the fifth indication information is 0, it indicates that the to-be-sent RDMA message is stored in the memory; and when the fifth indication information is 1, it indicates that the to-be-sent RDMA message is stored in the non-volatile storage medium (CMB). If the to-be-sent RDMA message is an RDMA WRITE message, the to-be-sent RDMA message is stored in a non-volatile storage medium. If the to-be-sent RDMA message is a SEND message, the to-be-sent RDMA message is stored in a memory.

The second processor 1131 may further generate third indication information (for example, a first skip identifier) for each WQE based on the first indication information and the second indication information. The third indication information indicates whether a to-be-sent RDMA message corresponding to the WQE is sent. For example, when a to-be-sent RDMA message is sent and a corresponding non-volatile storage medium is not faulty, the third indication information indicates that the to-be-sent RDMA message corresponding to a WQE is sent; or when a non-volatile storage medium corresponding to a to-be-sent RDMA message is faulty, the third indication information indicates that the to-be-sent RDMA message corresponding to a WQE is not sent. For example, when the third indication information is 1, it indicates that the to-be-sent RDMA message corresponding to the WQE is sent, and when the third indication information is 0, it indicates that the to-be-sent RDMA message corresponding to the WQE is not sent. Alternatively, when the third indication information is 0, it indicates that the to-be-sent RDMA message corresponding to the WQE is sent, and when the third indication information is 1, it indicates that the to-be-sent RDMA message corresponding to the WQE is not sent.

It should be noted that there is not limited to only one piece of first indication information or second indication information. For example, when there are a plurality of to-be-sent RDMA messages, there may be a plurality of pieces of first indication information, and when there are a plurality of non-volatile storage media, there may be a plurality of pieces of second indication information. Therefore, the second processor 1131 of the first NIC 113 may obtain one or more pieces of first indication information and one or more pieces of second indication information from the first processor 111.

For example, the second processor 1131 of the first NIC 113 may obtain a first piece of first indication information and a first piece of second indication information from the first processor 111. The first piece of first indication information indicates a first identifier of a non-volatile storage medium corresponding to a to-be-sent first RDMA message (an RDMA WRITE message or a SEND message corresponding to the RDMA WRITE message). The first piece of second indication information indicates whether the non-volatile storage medium corresponding to the first identifier is faulty.

For another example, the second processor 1131 of the first NIC 113 may obtain a second piece of first indication information and a second piece of second indication information from the first processor 111. The second piece of first indication information indicates a second identifier of a non-volatile storage medium corresponding to a to-be-sent second RDMA message (an RDMA WRITE message or a SEND message corresponding to the RDMA WRITE message). The second piece of second indication information indicates whether the non-volatile storage medium corresponding to the second identifier is faulty.

It should be noted that "first" and "second" herein are merely used to distinguish between different first indication information or second indication information, and are not used to limit a sequence or a quantity of pieces of the first indication information or the second indication information.

S1902: When the first piece of first indication information and the first piece of second indication information indicate that the non-volatile storage medium corresponding to the first RDMA message is not faulty, the communication interface 1132 of the first NIC 113 sends the first RDMA message.

Further, when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, the communication interface 1132 of the first NIC 113 does not send the first RDMA message, but sends the second RDMA message. A PSN of an RDMA packet in the second RDMA message is a PSN of a previously sent RDMA packet plus 1. For example, if a PSN of the previously sent RDMA packet is n, a PSN of the RDMA packet in the second RDMA message starts from n+1.

In an SQ, posting time of a WQE corresponding to the first RDMA message may be earlier than posting time of a WQE corresponding to the second RDMA message, that is, the first RDMA message is expected to be sent before the second RDMA message. In this case, sending of the first RDMA message is skipped. Alternatively, posting time of a WQE corresponding to the first RDMA message may be later than posting time of a WQE corresponding to the second RDMA message, that is, the second RDMA message is expected to be sent before the first RDMA message.

According to the network interface card, the message sending method, and the storage apparatus provided in embodiments of the present disclosure, before sending the RDMA message, the network interface card first obtains the first indication information and the second indication information. The first indication information indicates the first identifier of the non-volatile storage medium corresponding to the to-be-sent RDMA message, and the second indication information indicates whether the non-volatile storage medium corresponding to the first identifier is faulty, so that the network interface card determines whether the non-volatile storage medium corresponding to the RDMA message is faulty. The network interface card normally sends the RDMA message only when no fault occurs. In other words, when sending the RDMA message, the network interface card can learn whether the non-volatile storage medium is faulty, to perform corresponding processing on whether to send the RDMA message. In this way, the network interface card of a host client can always normally receive the RDMA message, to prevent a QP disconnection between a host client and the storage apparatus.

Figure 4:
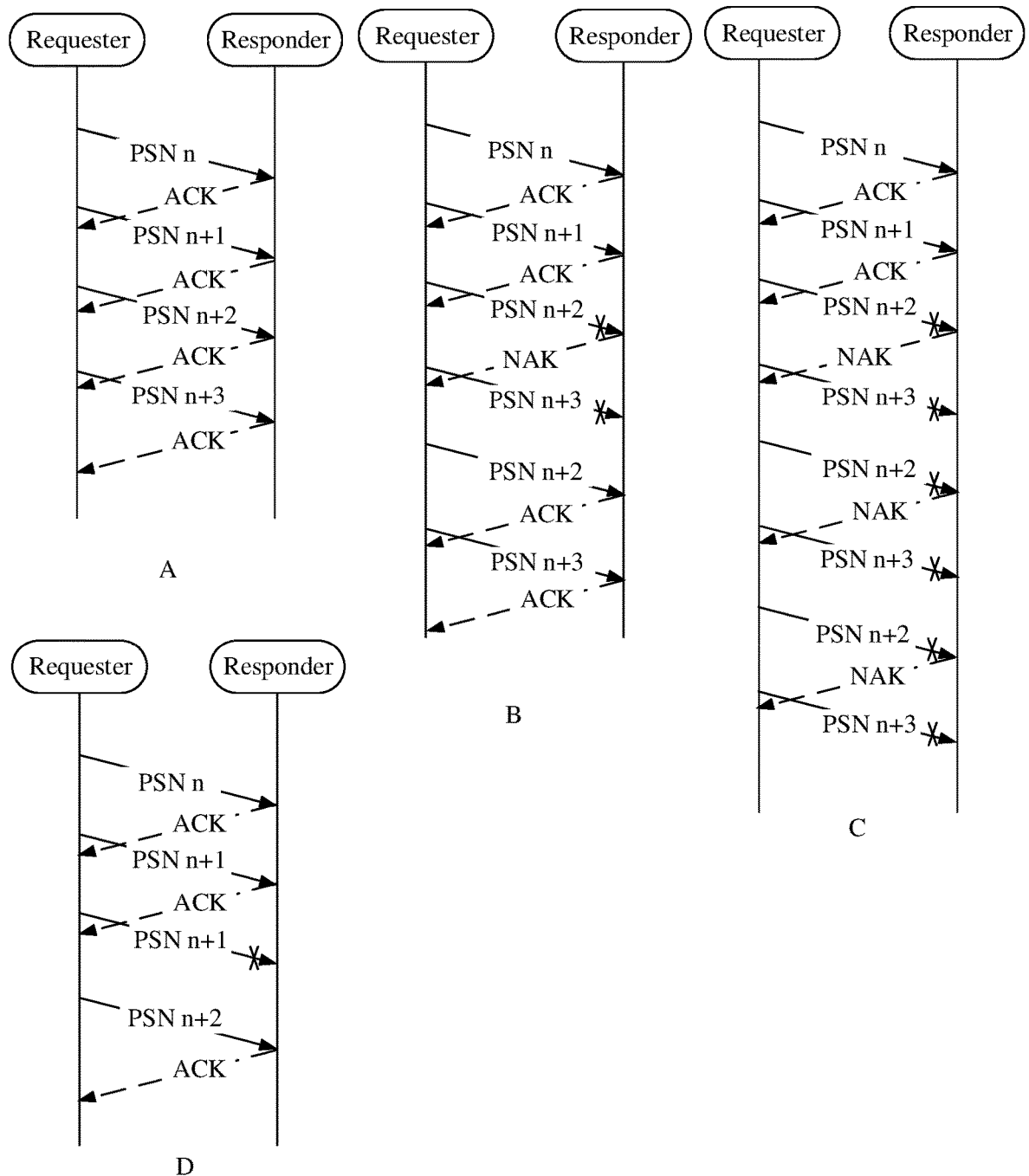
FIG. 4 is a schematic diagram of monotonic increasing of PSNs of an RDMA message according to an embodiment of the present disclosure.

In addition, as shown in FIG. 4, in a process of receiving an RDMA message, the host client 12 may send a non-acknowledge (NAK) message or an acknowledge (ACK) message to the storage apparatus 11. After receiving the non-acknowledge (NAK) message or the acknowledge (ACK) message, the communication interface 1132 of the first NIC 113 of the storage apparatus 11 posts, to a CQ, a CQE corresponding to a WQE. The second processor 1131 may set fourth indication information (for example, a second skip identifier) for a corresponding CQE based on third indication information corresponding to each WQE in an SQ. The fourth indication information indicates whether a WQE posted by NoF protocol software running in the first processor 111 or the second processor 1131 is not processed because a corresponding non-volatile storage medium is faulty. For example, when third indication information corresponding to a WQE indicates that an RDMA message corresponding to the WQE is not sent, fifth information corresponding to a CQE corresponding to the WQE indicates that a WQE posted by the NoF protocol software or the second processor 1131 is not processed because a corresponding non-volatile storage medium is faulty, and the second processor 1131 or the NoF protocol software running in the first processor 111 releases a resource related to the faulty non-volatile storage medium (for example, an IO state machine or a CMB space resource). When third indication information corresponding to a WQE indicates that an RDMA message corresponding to the WQE is sent, fifth information corresponding to a CQE corresponding to the WQE indicates that a WQE posted by the NoF protocol software or the second processor 1131 is processed because a corresponding non-volatile storage medium is not faulty. A parameter definition of a Verbs interface in the RDMA protocol may be extended. The fourth indication information may be in a CQE, or the fourth indication information may be transferred in another manner. This is not limited in embodiments of the present disclosure. For example, when the fourth indication information is 1, it indicates that a WQE posted by the NoF protocol software or the second processor 1131 is not processed because a corresponding non-volatile storage medium is faulty; and when the fourth indication information is 0, it indicates that the WQE posted by the NoF protocol software or the second processor 1131 is processed because the corresponding non-volatile storage medium is not faulty. Alternatively, when the fourth indication information is 0, it indicates that a WQE posted by the NoF protocol software or the second processor 1131 is not processed because a corresponding non-volatile storage medium is faulty; and when the fourth indication information is 1, it indicates that the WQE posted by the NoF protocol software or the second processor 1131 is processed because the corresponding non-volatile storage medium is not faulty.

It should be noted that an RDMA WRITE message may be split into a plurality of RDMA packets. It is possible that a non-volatile storage medium is not faulty when the communication interface 1132 sends first several RDMA packets, and the non-volatile storage medium is faulty when the communication interface 1132 sends last several RDMA packets. Therefore, each time the first NIC 113 sends an RDMA packet, the first NIC 113 first obtains first indication information and second indication information again. If the non-volatile storage medium is faulty, a subsequent packet in the RDMA WRITE message is not be sent. In this case, the communication interface 1132 may directly send a constructed RDMA packet (or referred to as a forged RDMA packet) for the RDMA WRITE message, where the constructed RDMA packet is filled with invalid information, and a PSN of the constructed RDMA packet is consistent with a PSN of the RDMA packet that is not sent in the RDMA WRITE message, to deceive the host client to receive the complete RDMA WRITE message. Alternatively, the communication interface 1132 may not send a constructed RDMA packet of the RDMA WRITE message, and may send the constructed RDMA packet when waiting for retransmission.

For a case in which the communication interface 1132 does not send the constructed RDMA packet but sends the constructed RDMA packet when waiting for retransmission, it is assumed that a first RDMA message is split into a plurality of RDMA packets (in this case, the first RDMA message is an RDMA WRITE message). Before a first RDMA packet of the first RDMA message is sent, the second processor 1131 of the first NIC 113 obtains a first piece of first indication information and a first piece of second indication information from the first processor 111, and the first piece of first indication information and the first piece of second indication information indicate that a non-volatile storage medium corresponding to the first RDMA message is not faulty. In this case, the communication interface 1132 of the first NIC 113 sends the first RDMA packet of the first RDMA message. Before a second RDMA packet of the first RDMA message is sent, the second processor 1131 of the first NIC 113 obtains a third piece of first indication information and a third piece of second indication information from the first processor 111, and the third piece of first indication information and the third piece of second indication information indicate that the non-volatile storage medium corresponding to the first RDMA message is faulty. In this case, the communication interface 1132 of the first NIC 113 does not send the remaining RDMA packets of the first RDMA message.

The host client 12 sends a non-acknowledge (NAK) message to the storage apparatus 11 because no subsequent RDMA packet of the first RDMA message (namely, the RDMA WRITE message) is received. For example, the non-acknowledge (NAK) message includes a PSN of a lost RDMA packet, to indicate the first NIC 113 to start retransmission from the RDMA packet corresponding to the PSN. After receiving the non-acknowledge (NAK) message from the host client 12, the communication interface 1132 determines, based on the PSN in the non-acknowledge (NAK) message, a WQE for starting retransmission, to determine that the lost RDMA packet belongs to a third RDMA message (corresponding to a same non-volatile storage medium as the first RDMA message). In addition, when the third piece of first indication information and the third piece of second indication information indicate that the non-volatile storage medium corresponding to the third RDMA message is faulty, the communication interface 1132 may send a constructed RDMA packet, where a packet sequence number of the constructed RDMA packet is consistent with a packet sequence number of the lost RDMA packet, to deceive the host client to receive the complete first RDMA message. Similarly, this avoids a case in which a network interface card of the host client frequently indicates a network interface card of a storage apparatus to perform retransmission because the network interface card of the host client always detects a packet loss in an RDMA message, so that a case in which a QP connection between the host client and the storage apparatus is disconnected because a quantity of retransmission times exceeds a threshold does not occur.

Figure 19:
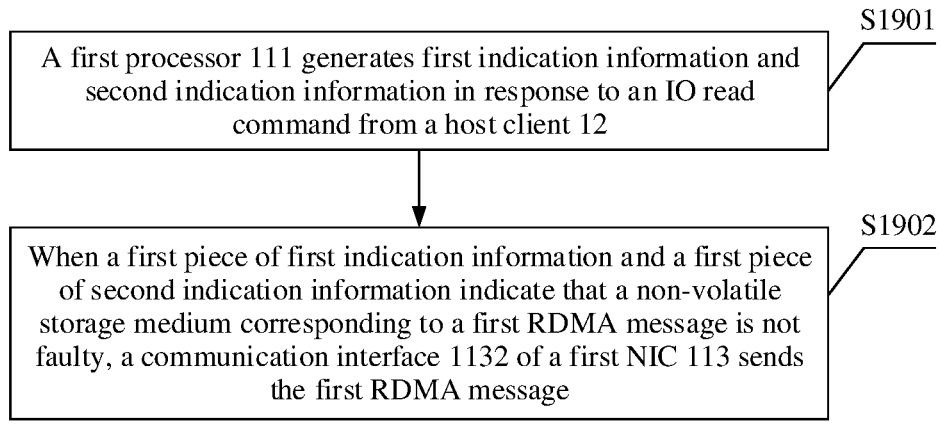
FIG. 19 is a schematic flowchart of a message sending method according to an embodiment of the present disclosure.
Figure 20:
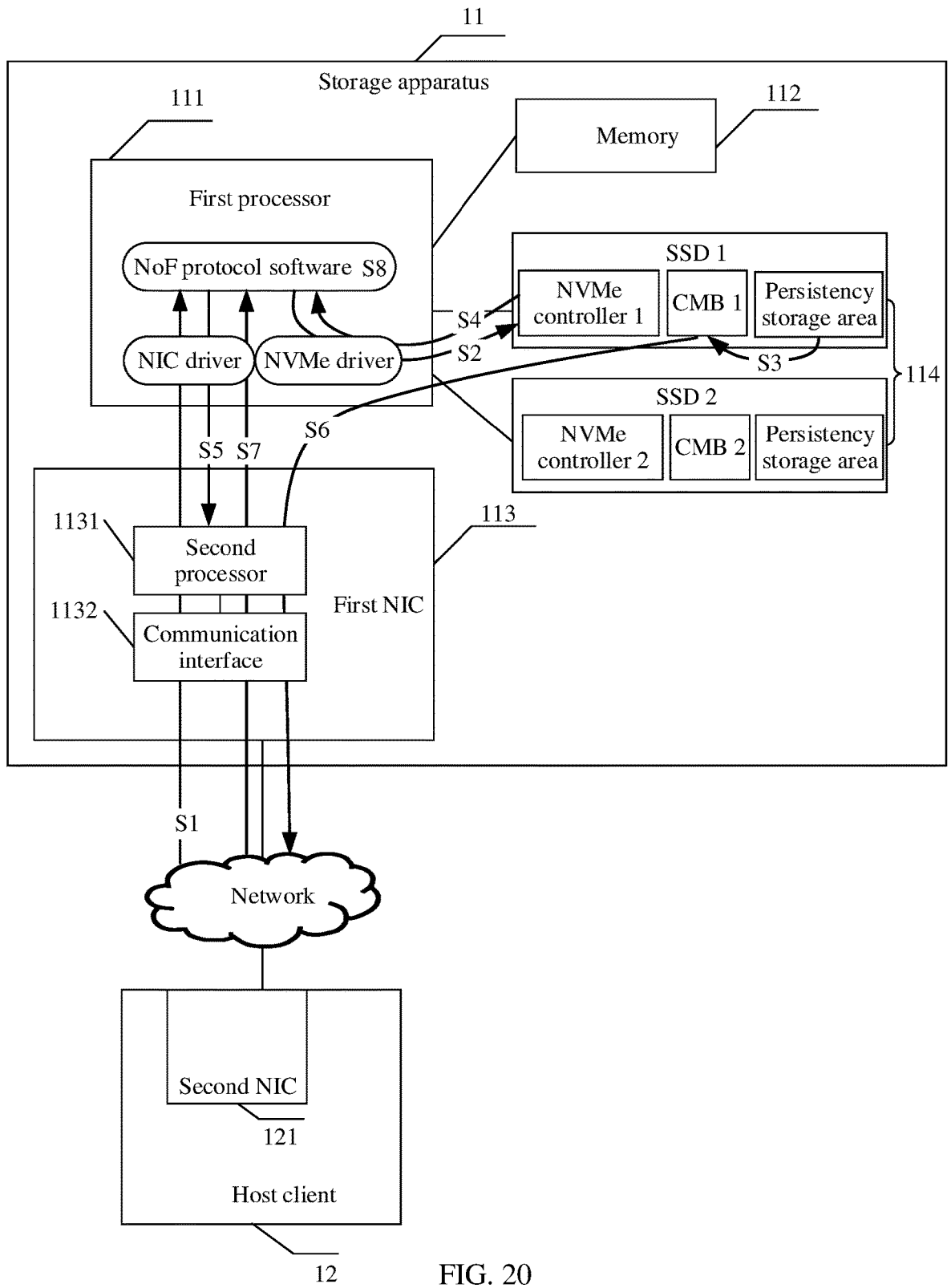
FIG. 20 is a schematic flowchart 3 of processing an IO read command by NoF protocol software according to an embodiment of the present disclosure.

As shown in FIG. 20, the message sending method in FIG. 19 is described with reference to a process of processing an IO read command by the first NIC 113.

S1: The communication interface 1132 of the first NIC 113 of the storage apparatus 11 receives a SEND message (carrying an IO read command) from the second NIC 121 of the host client 12, and sends the SEND message to the NoF protocol software (or the second processor 1131 of the first NIC 113) running in the first processor 111.

S2: The NoF protocol software (or the second processor 1131) running in the first processor 111 parses the IO read command, allocates data buffers in a CMB (for example, a CMB 1) of a corresponding non-volatile storage medium (for example, an SSD1), and posts the IO read command to an NVMe controller (for example, an NVMe controller 1) of the non-volatile storage medium (for example, the SSD 1).

S3: The NVMe controller (for example, the NVMe controller 1) executes the IO read command to copy IO data from a storage area of the non-volatile storage medium (for example, the SSD 1) to the data buffers in the CMB of the non-volatile storage medium (for example, the SSD 1).

S4: The NVMe controller (for example, the NVMe controller 1) reports an IO completion event to the NoF protocol software (or the second processor 1131), or the NoF protocol software (or the second processor 1131) polls an IO completion event of each non-volatile storage medium.

If the non-volatile storage medium (for example, the SSD 1) normally completes an IO read operation, step S5 is performed.

If the non-volatile storage medium (for example, the SSD 1) does not normally complete the IO read operation due to a fault or another reason, the NoF protocol software (or the second processor 1131) posts a WQE corresponding to a SEND message (carrying an IO response) to an SQ, to send the SEND message to the host client 12, and releases a resource (for example, an IO state machine or a CMB space resource) related to the faulty non-volatile storage medium, where the IO response indicates that the IO read operation is not completed.

S5: The NoF protocol software (or the second processor 1131) processes the IO completion event, and posts, to the SQ, a WQE corresponding to an RDMA WRITE message (carrying IO data) and a WQE corresponding to the SEND message (carrying the IO response), to send the RDMA WRITE message and the SEND message to the host client 12.

Both the two WQEs may include first indication information (for example, an identifier of the SSD 1) of a corresponding non-volatile storage medium. Optionally, the two WQEs may further include fifth indication information of a corresponding non-volatile storage medium. For example, fifth indication information in the WQE corresponding to the RDMA WRITE message may indicate that a to-be-sent first RDMA message is stored in an SSD, and fifth indication information in the WQE corresponding to the SEND message may indicate that a to-be-sent second RDMA message is stored in a DDR.

S6: The communication interface 1132 of the first NIC 113 performs an RDMA WRITE operation, obtains the IO data from the CMB of the non-volatile storage medium, and sends the IO data to the second NIC 121 by using an RDMA WRITE message. The communication interface 1132 further performs a SEND operation, and sends, to the second NIC 121, the SEND message carrying the IO response.

The second processor 1131 of the first NIC 113 may parse the WQE in the SQ, obtain first indication information (an identifier of a non-volatile storage medium) from the WQE, and query second indication information corresponding to the identifier to determine whether a corresponding non-volatile storage medium is faulty. If the corresponding non-volatile storage medium is not faulty, the RDMA WRITE message and the SEND message are sent normally. If the corresponding non-volatile storage medium is faulty, the RDMA WRITE message and the SEND message are not sent, and third indication information of the WQEs corresponding to the two messages is set to information indicating that RDMA packets corresponding to the WQEs are not sent.

S7: The communication interface 1132 of the first NIC 113 receives an acknowledge (ACK) message or a non-acknowledge (NAK) message from the second NIC 121, and reports a CQE to a CQ of the first processor 111 (or the second processor 1131), to release a related resource (for example, an IO state machine or a CMB space resource).

If the communication interface 1132 receives the acknowledge (ACK) message or the non-acknowledge (NAK) message, the communication interface 1132 locates a WQE in the SQ based on a PSN (a largest PSN of an RDMA packet received by the host client) carried in the acknowledge (ACK) message or the non-acknowledge (NAK) message, and reports a CQE to the CQ for each WQE. When the WQE in the SQ is located based on the PSN carried in the acknowledge (ACK) message, WQEs marked by the third indication information as not sending a corresponding RDMA packet are skipped (because RDMA packets corresponding to the WQEs are not sent, PSNs are not consumed).

Particularly, if the communication interface 1132 receives the non-acknowledge (NAK) message, the second processor 1131 locates a WQE in the SQ based on a PSN indicated in the non-acknowledge (NAK) message, reports a CQE for a WQE before the WQE, and starts retransmission from the WQE. During the retransmission, a constructed RDMA packet may be sent. For details, refer to the foregoing description.

It should be noted that, to prevent a QP disconnection because time in which the first NIC 113 obtains the first indication information is greater than time in which a quantity of retransmission times exceeds a threshold due to a plurality of times of retransmission, retransmission may be started after a specific time interval.

In addition, the CQE may include fourth indication information.

S8: When the NoF protocol software (or the second processor 1131) processes the CQE, if the fourth indication information indicates that the WQE posted by the NoF protocol software (or the second processor 1131) is not processed because a corresponding non-volatile storage medium is faulty, fault processing is performed on an IO read operation corresponding to the WQE.

Figure 21:
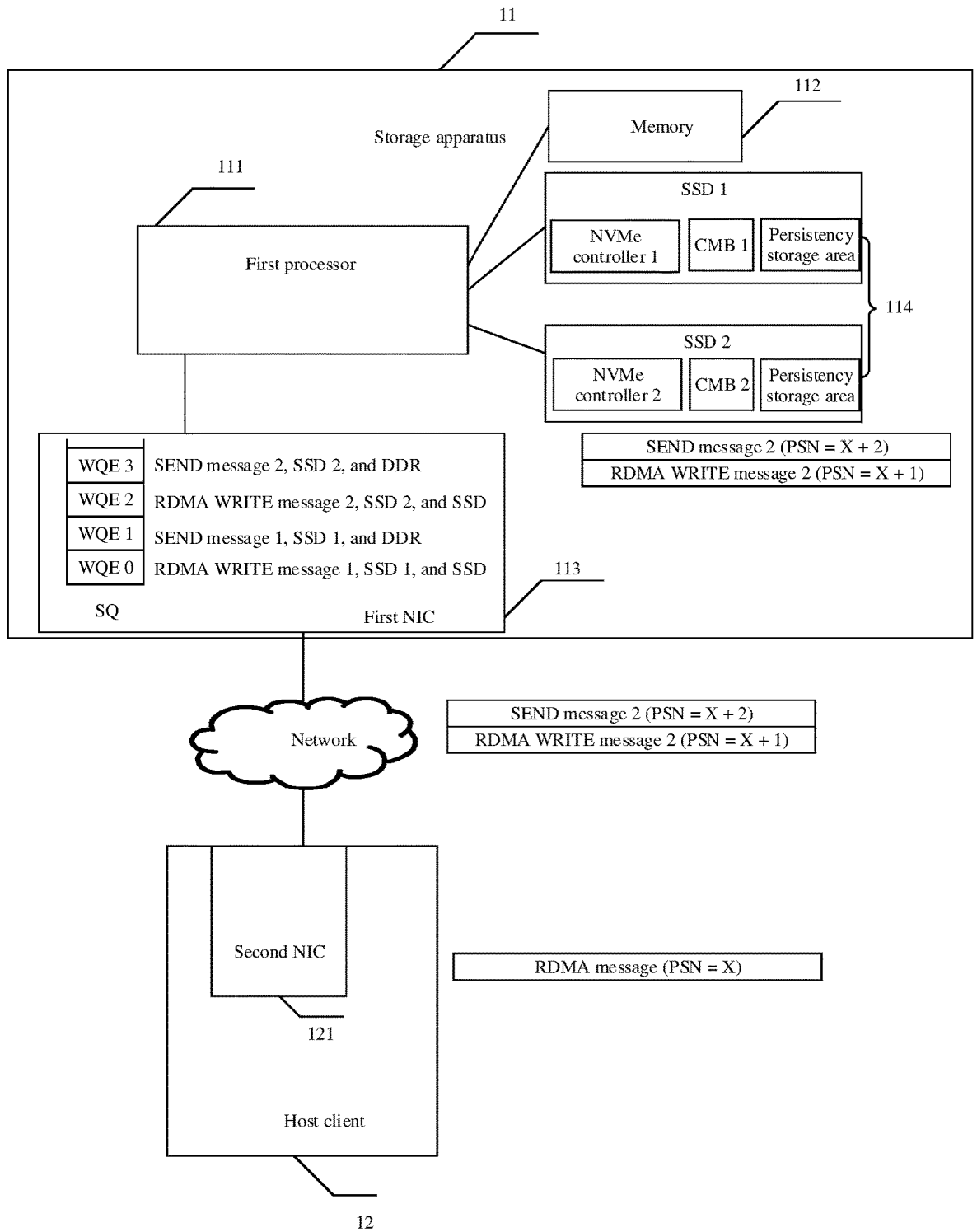
FIG. 21 is a schematic diagram 1 of avoiding disconnection of a QP connection by using the foregoing message sending method according to an embodiment of the present disclosure.
Figure 22:
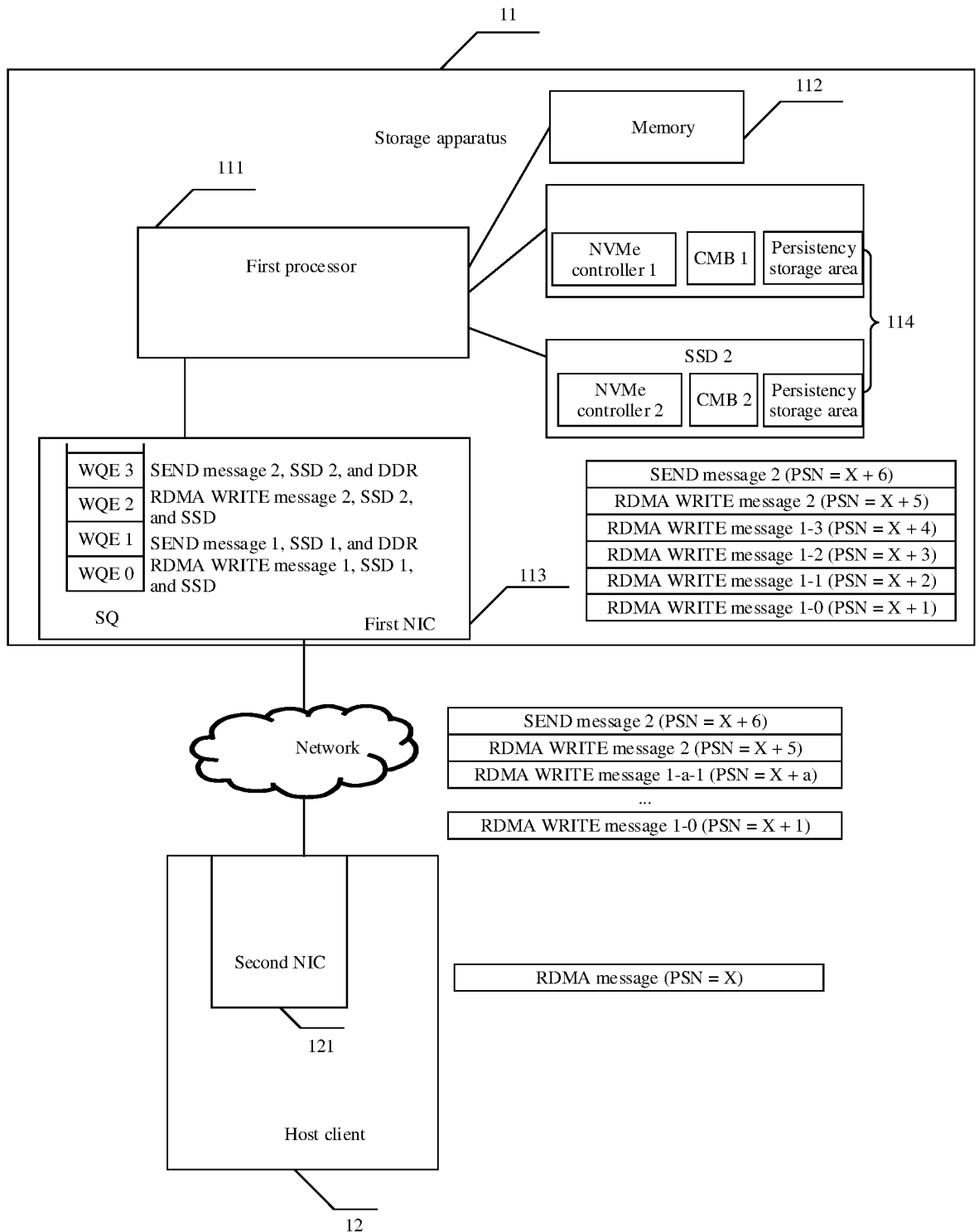
FIG. 22 is a schematic diagram 2 of avoiding disconnection of a QP connection by using the foregoing message sending method according to an embodiment of the present disclosure.

For the two scenarios in FIG. 16 and FIG. 17, manners in which the storage apparatus processes an RDMA WRITE message and a SEND message are shown in FIG. 21 and FIG. 22.

For the scenario 1 shown in FIG. 16 in which before the first NIC 113 sends an RDMA message (for example, an RDMA WRITE message 1) corresponding to an SSD 1, the SSD 1 is faulty, so that a CMB of the SSD 1 cannot be accessed, as shown in FIG. 21, a WQE 0 and a WQE 1 may further include first indication information of the SSD 1, and a WQE 2 and a WQE 3 may further include first indication information of an SSD 2. When sending the RDMA WRITE message 1 based on the WQE 0, the first NIC 113 queries the first indication information in the WQE 0 to determine that the RDMA WRITE message 1 corresponds to the SSD 1, and queries second indication information corresponding to the SSD 1 to determine that the SSD 1 is faulty. Therefore, the first NIC 113 does not send the RDMA WRITE message 1. When sending a SEND message 1 based on the WQE 1, the first NIC 113 queries the first indication information in the WQE 1 to determine that the SEND message 1 corresponds to the SSD 1, and queries the second indication information corresponding to the SSD 1 to determine that the SSD 1 is faulty. Therefore, the first NIC 113 does not send the SEND message 1. When sending an RDMA WRITE message 2 based on the WQE 2, the first NIC 113 queries the first indication information in the WQE 2 to determine that the RDMA WRITE message 2 corresponds to the SSD 2, and queries second indication information corresponding to the SSD 2 to determine that the SSD 2 is not faulty. Therefore, the first NIC 113 sends the RDMA WRITE message 2 (a PSN is X+1) to the second network interface card 121. When sending a SEND message 2 based on the WQE 3, the first NIC 113 queries the first indication information in the WQE 3 to determine that the SEND message 2 corresponds to the SSD 2, and queries the second indication information corresponding to the SSD 2 to determine that the SSD 2 is not faulty. Therefore, the first NIC 113 sends the SEND message 2 (a PSN is X+2) to the second network interface card 121.

In addition, the first NIC 113 may further set third indication information (for example, a first skip identifier) for each WQE based on each piece of first indication information and second indication information. For example, because the first indication information in the WQE 0 and the WQE 1 indicates to correspond to the SSD 1, and the second indication information corresponding to the SSD 1 indicates that the SSD 1 is faulty, the first NIC 113 may set third indication information in the WQE 0 and the WQE 1 to indicate that a first RDMA message corresponding to the WQE is not sent. Because the first indication information in the WQE 2 and the WQE 2 indicates to correspond to the SSD 2, and the second indication information corresponding to the SSD 2 indicates that the SSD 2 is not faulty, the first NIC 113 may set third indication information in the WQE 2 and the WQE 3 to indicate that a second RDMA message corresponding to the WQE is sent.

For the scenario 2 shown in FIG. 17 in which when the first NIC 113 sends an RDMA message (for example, an RDMA WRITE message 1), an SSD 1 is faulty, so that a CMB of the SSD 1 cannot be accessed, as shown in FIG. 22, when sending the RDMA WRITE message 1 based on the WQE 0, the first NIC 113 queries the first indication information in the WQE 0 to determine that the RDMA WRITE message 1 corresponds to the SSD 1, queries the second indication information corresponding to the SSD 1 to determine that the SSD 1 is not faulty, and then splits the RDMA WRITE message 1 into four RDMA packets (an RDMA WRITE message 1-0 to an RDMA WRITE message 1-3 whose PSNs are X+1 to X+4). It is assumed that the first NIC 113 has sent a (a≥1 and a<4) RDMA packets (PSNs are X+1 to X+a) of the RDMA WRITE message 1, and then the SSD 1 is faulty, so that the CMB of the SSD 1 cannot be accessed. In this case, when sending, based on the WQE 0, remaining (4-a) RDMA packets (PSNs are X+a+1 to X+4) of the RDMA WRITE message 1, the first NIC 113 queries the second indication information corresponding to the SSD 1 to determine that the SSD 1 is faulty. Therefore, the first NIC 113 does not send the remaining (4-a) RDMA packets (PSNs are X+a+1 to X+4) of the RDMA WRITE message 1. When sending a SEND message 1 based on the WQE 1, the first NIC 113 queries the first indication information in the WQE 1 to determine that the SEND message 1 corresponds to the SSD 1, and queries the second indication information corresponding to the SSD 1 to determine that the SSD 1 is faulty. Therefore, the first NIC 113 does not send the SEND message 1. When sending an RDMA WRITE message 2 based on the WQE 2, the first NIC 113 queries the first indication information in the WQE 2 to determine that the RDMA WRITE message 2 corresponds to the SSD 2, and queries second indication information corresponding to the SSD 2 to determine that the SSD 2 is not faulty. Therefore, the first NIC 113 sends the RDMA WRITE message 2 (a PSN is X+5) to the second network interface card 121. When sending a SEND message 2 based on the WQE 3, the first NIC 113 queries the first indication information in the WQE 3 to determine that the SEND message 2 corresponds to the SSD 2, and queries the second indication information corresponding to the SSD 2 to determine that the SSD 2 is not faulty. Therefore, the first NIC 113 sends the SEND message 2 (a PSN is X+6) to the second network interface card 121.

The second network interface card 121 detects a packet loss, and sends a non-acknowledge (NAK) message to notify the first NIC 113 to start retransmission from an RDMA packet whose PSN is X+a+1. The first NIC 113 determines, based on the PSN in the non-acknowledge (NAK) message, to start retransmission from the RDMA packet whose PSN is X+a+1 and that corresponds to the WQE 0. When retransmitting RDMA packets whose PSNs are X+a+1 to X+4, the first NIC 113 queries the first indication information in the WQE 0 to determine that these RDMA packets correspond to the SSD 1, and queries second indication information corresponding to the SSD 1 to determine that the SSD 1 is faulty. The first NIC 113 does not read IO data from the SSD 1 to form an RDMA packet, but sends constructed RDMA packets (PSNs are X+a+1 to X+4) for an RDMA WRITE message 1, to deceive the host client to receive the complete RDMA WRITE message 1. Therefore, the first NIC 113 is not notified to perform retransmission. When sending a SEND message 1 based on the WQE 1, the first NIC 113 queries the first indication information in the WQE 1 to determine that the SEND message 1 corresponds to the SSD 1, and queries the second indication information corresponding to the SSD 1 to determine that the SSD 1 is faulty. Therefore, the first NIC 113 does not send the SEND message 1. When sending an RDMA WRITE message 2 based on the WQE 2, the first NIC 113 queries the first indication information in the WQE 2 to determine that the RDMA WRITE message 2 corresponds to the SSD 2, and queries second indication information corresponding to the SSD 2 to determine that the SSD 2 is not faulty. Therefore, the first NIC 113 sends the RDMA WRITE message 2 (a PSN is X+5) to the second network interface card 121. When sending a SEND message 2 based on the WQE 3, the first NIC 113 queries the first indication information in the WQE 3 to determine that the SEND message 2 corresponds to the SSD 2, and queries the second indication information corresponding to the SSD 2 to determine that the SSD 2 is not faulty. Therefore, the first NIC 113 sends the SEND message 2 (a PSN is X+6) to the second network interface card 121.

Figure 23:
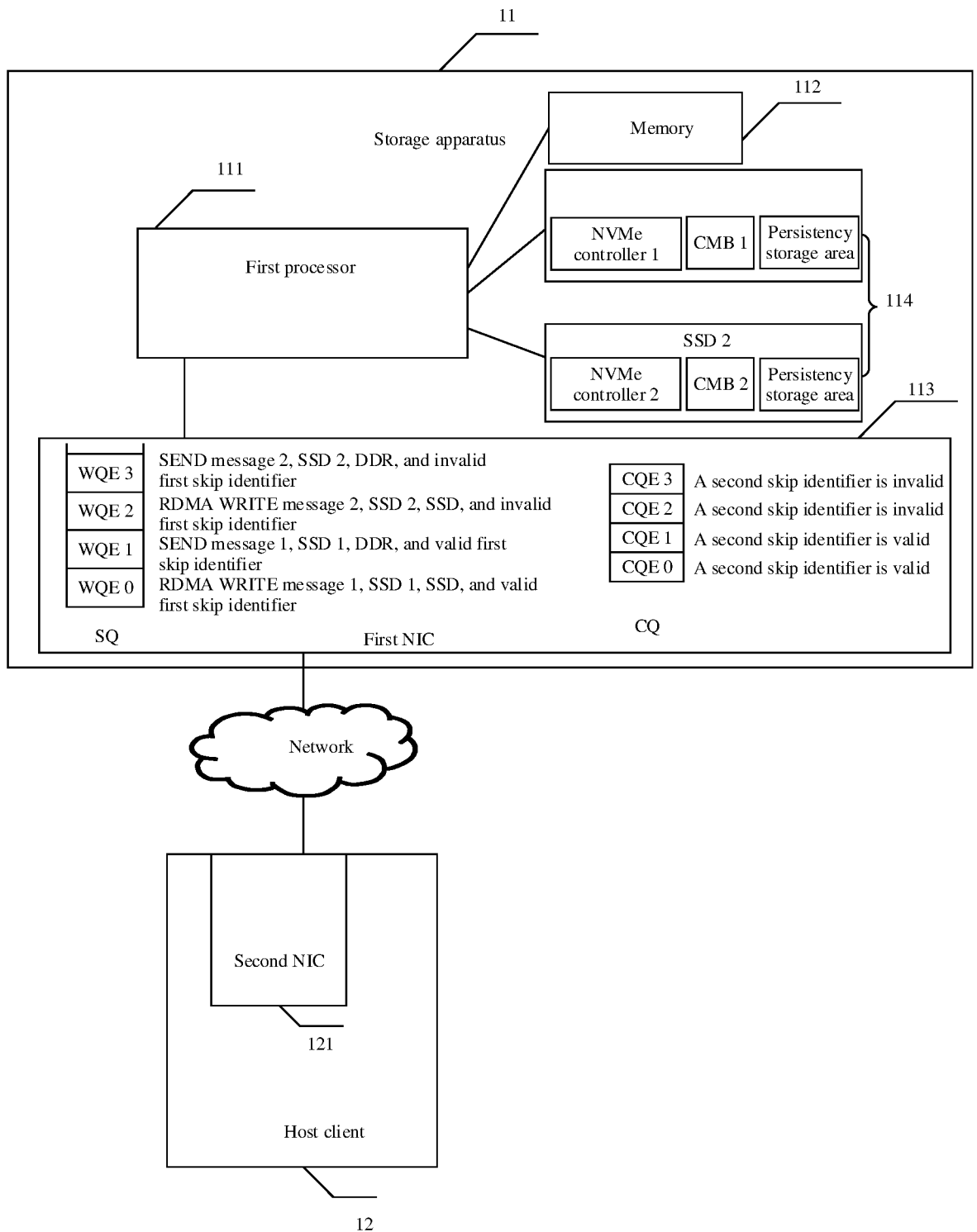
FIG. 23 is a schematic diagram 3 of avoiding disconnection of a QP connection by using the foregoing message sending method according to an embodiment of the present disclosure.

For the two scenarios in FIG. 21 and FIG. 22, a manner in which the storage apparatus processes an acknowledge (ACK) message/a non-acknowledge (NAK) message of an RDMA WRITE message or a SEND message is shown in FIG. 23.

As shown in FIG. 23, each time after receiving an acknowledge (ACK) message/a non-acknowledge (NAK) message, the first NIC 113 of the storage apparatus 11 reports a CQE for a corresponding WQE in an SQ and a WQE for which no CQE is previously reported.

In the scenario in FIG. 21, the first NIC 113 receives an acknowledge (ACK) message/a non-acknowledge (NAK) message for an RDMA packet whose PSN is X+2, and determines a corresponding WQE in the SQ based on the PSN in the acknowledge (ACK) message/the non-acknowledge (NAK) message. Because third indication information (for example, a first skip identifier) corresponding to the WQE 0 and the WQE 1 indicates that a first RDMA message corresponding to the WQE is not sent, no PSN is consumed. Third indication information corresponding to the WQE 2 and the WQE 3 indicates that a second RDMA message corresponding to the WQE is sent. Therefore, the WQE 2 consumes one PSN (corresponding to a PSN of X+1), and the WQE 3 consumes one PSN (corresponding to a PSN of X+2). Therefore, a corresponding WQE is the WQE 3 can be determined based on an acknowledge (ACK) message/a non-acknowledge (NAK) message for an RDMA message whose PSN is X+2. The first NIC 113 respectively reports a CQE 0 to a CQE 3 for the WQE 0 to the WQE 3.

The first NIC 113 may also set fourth indication information (for example, a second skip identifier) for a corresponding CQE based on the third indication information (for example, a first skip identifier) corresponding to each WQE. For example, because third indication information corresponding to the WQE 0 indicates that an RDMA message corresponding to the WQE 0 is not sent, fifth information corresponding to the CQE 0 corresponding to the WQE 0 indicates that the WQE 0 posted by the NoF protocol software or the second processor 1131 is not processed because a corresponding non-volatile storage medium is faulty. Similarly, because third indication information corresponding to the WQE 1 indicates that an RDMA message corresponding to the WQE 1 is not sent, fifth information corresponding to the CQE 1 corresponding to the WQE 1 indicates that the WQE 1 posted by the NoF protocol software or the second processor 1131 is not processed because a corresponding non-volatile storage medium is faulty. Because third indication information corresponding to the WQE 2 indicates that an RDMA message corresponding to the WQE 2 is sent, fifth information corresponding to the CQE 2 corresponding to the WQE 2 indicates that the WQE 2 posted by the NoF protocol software or the second processor 1131 is processed because a corresponding non-volatile storage medium is not faulty. Similarly, because third indication information corresponding to the WQE 3 indicates that an RDMA message corresponding to the WQE 3 is sent, fifth information corresponding to the CQE 3 corresponding to the WQE 3 indicates that the WQE 3 posted by the NoF protocol software or the second processor 1131 is processed because a corresponding non-volatile storage medium is not faulty.

The NoF protocol software running in the first processor 111 (or the NoF IO offloading module running in the first NIC 113) may poll a CQE posted by the first NIC 113. If fourth indication information of a CQE indicates that a WQE posted by the NoF protocol software or the second processor 1131 is processed because a corresponding non-volatile storage medium is not faulty, a resource occupied by a corresponding IO read operation is normally released; and if fourth indication information of a CQE indicates that a WQE posted by the NoF protocol software or the second processor 1131 is not processed because a corresponding non-volatile storage medium is faulty, a resource occupied by a corresponding IO operation is released, and an IO response is returned to the host client 12, where the IO response indicates that the IO read operation fails.

An embodiment of the present disclosure provides a computer-readable storage medium storing one or more programs. The one or more programs include instructions. When the instructions are executed by a network interface card, the network interface card is enabled to perform the method shown in FIG. 19.

An embodiment of the present disclosure provides a computer program product including instructions. When the instructions are executed by a network interface card, the network interface card is enabled to perform the method shown in FIG. 19.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of embodiments of the present disclosure.

A person of ordinary skill in the art may be aware that, in combination with the examples described in embodiments disclosed in this specification, modules, and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and module, refer to a corresponding process in the foregoing method embodiments.

In several embodiments provided in the present disclosure, it should be understood that the disclosed system, device, and method may be implemented in other manners. For example, the described device embodiment is merely an example. For example, division of the module is merely logical function division and may be other division in an actual implementation. For example, a plurality of modules or components may be combined or integrated into another device, or some features may be ignored, or are not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one device, or may be distributed on a plurality of devices. Some or all of the modules may be selected based on actual requirements to achieve the objectives of the solutions of embodiments.

In addition, functional modules in embodiments of the present disclosure may be integrated into one device, or each module may exist alone physically, or two or more modules may be integrated into one device.

All or some of the foregoing embodiments may be implemented by using software, hardware, firmware, or any combination thereof. When a software program is used for an implementation, the implementation may be totally or partially implemented in a form of a computer program product. The computer program product includes one or more computer instructions. When computer program instructions are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device like a server or a data center integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network interface card, comprising at least one processor and a communication interface connected to the at least one processor, wherein the at least one processor is configured to obtain a first piece of first indication information and a first piece of second indication information, wherein the first piece of first indication information indicates a first identifier of a non-volatile storage medium corresponding to a first remote direct memory access (RDMA) message, and the first piece of second indication information indicates whether the non-volatile storage medium corresponding to the first identifier is faulty; and the communication interface is configured to send the first RDMA message when the first piece of first indication information and the first piece of second indication

43 information indicate that the non-volatile storage medium corresponding to the first RDMA message is not faulty, and prevent the first RDMA message from being sent when the first piece of first indication information and the first piece of second indication information indicate that the non-volatile storage medium corresponding to the first RDMA message is faulty, wherein the at least one processor is further configured to obtain a second piece of first indication information and a second piece of second indication information, wherein the second piece of first indication information indicates a second identifier of a non-volatile storage medium corresponding to a second RDMA message, and the second piece of second indication information indicates whether the non-volatile storage medium corresponding to the second identifier is faulty; and the communication interface is further configured to send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, wherein a packet sequence number of an RDMA packet in the second RDMA message is equal to a packet sequence number of a most recently sent RDMA packet plus 1.

2. The network interface card according to claim 1, wherein in a send queue, posting time of a work queue element corresponding to the first RDMA message is earlier than posting time of a work queue element corresponding to the second RDMA message.

3. The network interface card according to claim 1, wherein the at least one processor is further configured to obtain a third piece of first indication information and a third piece of second indication information, wherein the third piece of first indication information indicates a third identifier of a non-volatile storage medium corresponding to a third RDMA message, and the third piece of second indication information indicates whether the non-volatile storage medium corresponding to the third identifier is faulty; and the communication interface is further configured to:
receive a non-acknowledge message indicating a packet sequence number of a lost RDMA packet, wherein the lost RDMA packet corresponds to the third RDMA message, and the third piece of first indication information and the third piece of second indication information indicate that the non-volatile storage medium corresponding to the third RDMA message is faulty; and send a constructed RDMA packet, wherein a packet sequence number of the constructed RDMA packet is the same as the packet sequence number of the lost RDMA packet.

4. The network interface card according to claim 2, wherein the first indication information is in a work queue element in the send queue.

5. The network interface card according to claim 2, wherein the at least one processor is further configured to generate third indication information indicating whether a fourth RDMA message corresponding to a work queue element in the send queue is sent, wherein, when the fourth RDMA message is sent and a corresponding non-volatile storage medium is not faulty, the third indication information indicates that the fourth RDMA message is sent, or when a non-volatile storage medium corresponding to the fourth RDMA message is faulty, the third indication information indicates that the fourth RDMA message is not sent.

6. The network interface card according to claim 3, wherein the at least one processor is further configured to:
post a completion queue element to a completion queue after the communication interface receives the non-acknowledge message or an acknowledge message, wherein the completion queue element comprises fourth indication information indicating whether a posted work queue element is not processed because a corresponding non-volatile storage medium is faulty.

7. A message sending method, comprising:
obtaining a first piece of first indication information and a first piece of second indication information, wherein the first piece of first indication information indicates a first identifier of a non-volatile storage medium corresponding to a first remote direct memory access (RDMA) message, and the first piece of second indication information indicates whether the non-volatile storage medium corresponding to the first identifier is faulty; and sending the first RDMA message when the first piece of first indication information and the first piece of second indication information indicate that the non-volatile storage medium corresponding to the first RDMA message is not faulty, and preventing the first RDMA message from being sent when the first piece of first indication information and the first piece of second indication information indicate that the non-volatile storage medium corresponding to the first RDMA message is faulty;

obtaining a second piece of first indication information and a second piece of second indication information, wherein the second piece of first indication information indicates a second identifier of a non-volatile storage medium corresponding to a second RDMA message, and the second piece of second indication information indicates whether the non-volatile storage medium corresponding to the second identifier is faulty; and sending the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, wherein a packet sequence number of an RDMA packet in the second RDMA message is equal to a packet sequence number of a most recently sent RDMA packet plus 1.

8. The method according to claim 7, wherein in a send queue, posting time of a work queue element corresponding to the first RDMA message is earlier than posting time of a work queue element corresponding to the second RDMA message.

9. The method according to claim 7, further comprising:
obtaining a third piece of first indication information and a third piece of second indication information, wherein the third piece of first indication information indicates a third identifier of a non-volatile storage medium corresponding to a third RDMA message, and the third piece of second indication information indicates whether the non-volatile storage medium corresponding to the third identifier is faulty;
receiving a non-acknowledge message, wherein the non-acknowledge message indicates a packet sequence number of a lost RDMA packet corresponding to the third RDMA message, and the third piece of first indication information and the third piece of second indication information indicate that the non-volatile storage medium corresponding to the third RDMA message is faulty; and
sending a constructed RDMA packet, wherein a packet sequence number of the constructed RDMA packet is the same as the packet sequence number of the lost RDMA packet.

10. The method according to claim 8, wherein the first indication information is in a work queue element in the send queue.

11. The method according to claim 8, further comprising:
generating third indication information indicating whether a fourth RDMA message corresponding to a work queue element in the send queue is sent, wherein, when the fourth RDMA message is sent and a corresponding non-volatile storage medium is not faulty, the third indication information indicates that the fourth RDMA message is sent, or when a non-volatile storage medium corresponding to the fourth RDMA message is faulty, the third indication information indicates that the fourth RDMA message is not sent.

12. The method according to claim 9, further comprising:
posting a completion queue element to a completion queue after receiving the non-acknowledge message or an acknowledge message, wherein the completion queue element comprises fourth indication information indicating whether a posted work queue element is not processed because a corresponding non-volatile storage medium is faulty.

13. A storage apparatus, comprising a network interface card, at least one processor, and a plurality of non-volatile storage media, wherein
the at least one processor is configured to generate a first piece of first indication information and a first piece of second indication information in response to an input/output (IO) read command from a host client, wherein the first piece of first indication information indicates a first identifier of a non-volatile storage medium corresponding to a first remote direct memory access (RDMA) message, and the first piece of second indication information indicates whether the non-volatile storage medium corresponding to the first identifier is faulty; and
the network interface card is configured to: obtain the first piece of first indication information and the first piece of second indication information; and send the first RDMA message when the first piece of first indication information and the first piece of second indication information indicate that the non-volatile storage medium corresponding to the first RDMA message is not faulty, wherein
the at least one processor is further configured to generate a second piece of first indication information and a second piece of second indication information, wherein the second piece of first indication information indicates a second identifier of a non-volatile storage medium corresponding to a second RDMA message, and the second piece of second indication information indicates whether the non-volatile storage medium corresponding to the second identifier is faulty; and
the network interface card is further configured to obtain the second piece of first indication information and the second piece of second indication information; and send the second RDMA message when the first piece of first indication information and the first piece of second indication information indicate that the non-volatile storage medium corresponding to the first RDMA message is faulty, and the second piece of first indication information and the second piece of second indication information indicate that the non-volatile storage medium corresponding to the second RDMA message is not faulty, wherein a packet sequence number of an RDMA packet in the second RDMA message is equal to a packet sequence number of a most recently sent RDMA packet plus 1.

14. The storage apparatus according to claim 13, wherein in a send queue, posting time of a work queue element corresponding to the first RDMA message is earlier than posting time of a work queue element corresponding to the second RDMA message.

15. The storage apparatus according to claim 13, further comprising:
the at least one processor, further configured to generate a third piece of first indication information and a third piece of second indication information, wherein the third piece of first indication information indicates a third identifier of a non-volatile storage medium corresponding to a third RDMA message, and the third piece of second indication information indicates whether the non-volatile storage medium corresponding to the third identifier is faulty; and
the network interface card, further configured to: obtain the third piece of first indication information and the third piece of second indication information; receive a non-acknowledge message, wherein the non-acknowledge message indicates a packet sequence number of a lost RDMA packet corresponding to the third RDMA message; and send a constructed RDMA packet, wherein a packet sequence number of the constructed RDMA packet is the same as the packet sequence number of the lost RDMA packet.

16. The storage apparatus according to claim 14, wherein the first indication information is in a work queue element in the send queue.

17. The storage apparatus according to claim 14, wherein the network interface card is further configured to:
generate third indication information indicating whether a fourth RDMA message corresponding to a work queue element in the send queue is sent, wherein, when the fourth RDMA message is sent and a corresponding non-volatile storage medium is not faulty, the third indication information indicates that the fourth RDMA message is sent, or when a non-volatile storage medium corresponding to the fourth RDMA message is faulty, the third indication information indicates that the fourth RDMA message is not sent.

* * * * *

UNITED STATES PATENT AND TRADEMARK OFFICE
CERTIFICATE OF CORRECTION

PATENT NO. : 12,487,877 B2
APPLICATION NO. : 18/606002
DATED : December 2, 2025
INVENTOR(S) : Zhaojiao Han It is certified that error appears in the above-identified patent and that said Letters Patent is hereby corrected as shown below:

In the Specification

Column 19, Line 21, change "ROCE" to --RoCE--;

Column 20, Line 37, change "QPb" to --QP b--; and

In the Claims

Column 44, Claim 7, Line 25, change "faulty; and" to --faulty;--.

Signed and Sealed this
Sixth Day of January, 2026

John A. Squires
*Director of the United States Patent and Trademark Office*